US012680378B1

(12) United States Patent
Lu

(10) Patent No.: US 12,680,378 B1
(45) Date of Patent: Jul. 14, 2026

(54) BLIND CORD RESISTANCE ADJUSTMENT STRUCTURE AND BLIND

(71) Applicant: Ningbo Zhenfei Decorated Curtain Co., Ltd., Yuyao (CN)

(72) Inventor: Jiefei Lu, Yuyao (CN)

(73) Assignee: Ningbo Zhenfei Decorated Curtain Co., Ltd., Yuyao (CN)

( * ) Notice: Subject to any disclaimer, the term of this patent is extended or adjusted under 35 U.S.C. 154(b) by 59 days.

(21) Appl. No.: 19/301,878

(22) Filed: Aug. 15, 2025

(30) Foreign Application Priority Data

Jun. 25, 2025 (CN) ......................... 202521311134.5
Jun. 25, 2025 (CN) ......................... 202521311415.0
Jun. 25, 2025 (CN) ......................... 202521312409.7

(51) Int. Cl.
*E06B 9/322* (2006.01)
*E06B 9/326* (2006.01)
*E06B 9/262* (2006.01)

(52) U.S. Cl.
CPC .............. *E06B 9/322* (2013.01); *E06B 9/326* (2013.01); *E06B 9/262* (2013.01); *E06B 2009/2625* (2013.01); *E06B 2009/3222* (2013.01)

(58) Field of Classification Search
CPC .......... E06B 9/322; E06B 9/262; E06B 9/326; E06B 2009/2625; E06B 2009/3222; E06B 2009/3225
See application file for complete search history.

(56) References Cited

U.S. PATENT DOCUMENTS 6,691,760 B1 * 2/2004 Randall, Jr. ............. E06B 9/323 160/177 V
7,341,091 B2 * 3/2008 Nien ....................... E06B 9/322 160/170
8,708,023 B2 * 4/2014 Wu ......................... E06B 9/327 160/172 R
9,181,751 B1 * 11/2015 Hong ...................... E06B 9/303
9,677,583 B1 * 6/2017 Wong ..................... F16M 13/02
10,704,658 B2 * 7/2020 Chen ................... F16H 19/0672
10,988,981 B2 * 4/2021 Lei .......................... E06B 9/324
11,047,172 B2 * 6/2021 Huang .................... E06B 9/322
11,286,714 B2 * 3/2022 Lei .......................... E06B 9/322
11,549,307 B2 * 1/2023 Torres ..................... E06B 9/322
11,970,901 B2 * 4/2024 Luo ......................... E06B 9/305
12,037,843 B2 * 7/2024 Liang ...................... E06B 9/302
12,421,795 B2 * 9/2025 Luo ......................... E06B 9/327
2007/0029051 A1 * 2/2007 Nien ....................... E06B 9/322 160/84.05

(Continued)

*Primary Examiner* — Johnnie A. Shablack

(57) ABSTRACT

A blind cord resistance adjustment structure and a curtain are provided. The structure includes a cord-winding shaft assembly, an adjustment block, and a blind cord. The cord-winding shaft assembly includes a housing, a rotating shaft, and a shaft sleeve. The shaft sleeve is rotatably mounted inside the housing along its circumferential direction and is sleeved onto and rotates synchronously with the rotating shaft. The upper end of the blind cord is connected to the shaft sleeve. The adjustment block is slidably disposed in the horizontal or substantially horizontal direction on the lower side of the housing. The housing is provided with a first through-hole for the blind cord to pass through, and the adjustment block is provided with a second through-hole for the blind cord to pass through.

20 Claims, 17 Drawing Sheets

(56) References Cited

U.S. PATENT DOCUMENTS

| | | | | |
|---|---|---|---|---|
| 2007/0056692 | A1* | 3/2007 | Nien | E06B 9/322 160/168.1 R |
| 2011/0277943 | A1* | 11/2011 | Lin | E06B 9/90 160/241 |
| 2013/0032300 | A1* | 2/2013 | Yu | E06B 9/322 160/84.02 |
| 2016/0290038 | A1* | 10/2016 | Hung | E06B 9/322 |
| 2018/0291678 | A1* | 10/2018 | Zheng | E06B 9/322 |
| 2018/0347269 | A1* | 12/2018 | Wang | E06B 9/30 |
| 2022/0325576 | A1* | 10/2022 | Hsu | E06B 9/322 |
| 2024/0117671 | A1* | 4/2024 | Luo | E06B 9/322 |
| 2024/0418036 | A1* | 12/2024 | Huang | E06B 9/324 |

* cited by examiner

BLIND CORD RESISTANCE ADJUSTMENT STRUCTURE AND BLIND

CROSS REFERENCE TO RELATED APPLICATIONS

The present application claims the benefit of Chinese Patent Application Nos. 202521312409.7, 202521311415.0 and 202521311134.5 filed on Jun. 25, 2025. All the above are hereby incorporated by reference in their entirety.

TECHNICAL FIELD

The present disclosure relates to the technical field of blinds, and in particular to a blind cord resistance adjustment structure and a blind.

BACKGROUND

A Roman blind is a common type of curtain made up of multiple parallel fabric strips. When the blind cord is pulled, the fabric strips fold into parallel, stacked layers, thereby achieving the effect of blocking sunlight and protecting privacy. Existing curtain products such as Roman blinds typically include an upper beam bracket, a lower beam bracket, blind cords, blind fabric, and a cord winder. The cord winder is mounted on the upper beam bracket. Roman blinds can be classified into manual and motorized types, with corresponding manual and electric cord winders. A manual cord winder typically consists of a housing, a coil spring, and a winding shaft. One end of the blind cord is connected to the winding shaft, while the other end is connected to a cord buckle on the lower beam bracket. The tension of the coil spring acts on the upper end of the blind cord, while the total weight of the lower beam bracket and blind fabric acts on the lower end of the cord. The spring tension balances this total weight, allowing the user to adjust the height of the blind fabric by lifting or pulling down the lower beam bracket to the desired height and then releasing it, where it stays suspended. In contrast, existing motorized Roman blinds typically use a motor to drive the winding shaft to rotate, thereby rolling up or releasing the blind cord to adjust the height of the blind fabric.

Some existing manual Roman blinds are typically equipped with friction braking devices (such as gear locks, dampers, etc.) to compensate for fluctuations in the coil spring's tension, thereby assisting in the suspension of the blind fabric. However, the friction force provided by current friction braking devices is not easily adjustable. When the blind fabric is larger and heavier, the friction force may often be insufficient. As a result, the blind fabric may slip downward from the position where the user releases it, failing to remain suspended at the desired height. This makes accurate positioning of the blind difficult and negatively impacts the user experience.

SUMMARY

In order to solve at least one aspect of the above problems, the present disclosure provides a blind cord resistance adjustment structure, including a cord-winding shaft assembly, an adjustment block and a blind cord; the cord-winding shaft assembly includes a housing, a rotating shaft and a shaft sleeve, the shaft sleeve is rotatably mounted in the housing along its circumferential direction, the shaft sleeve is sleeved on the rotating shaft and rotates synchronously with the rotating shaft, an upper end of the blind cord is connected to the shaft sleeve, the adjustment block is slidably arranged on a lower side of the housing along a horizontal direction or a substantially horizontal direction, the housing is provided with a first through-hole for the blind cord to pass through, the adjustment block is provided with a second through-hole for the blind cord to pass through, the adjustment block is provided with an elastically deformable deformation portion, the deformation portion is provided with first positioning teeth, the housing is provided with a plurality of first positioning grooves corresponding to the first positioning teeth, and the plurality of first positioning grooves are distributed along a sliding direction of the adjustment block.

Optionally, a first wear-resistant member is provided on the housing, a second wear-resistant member is provided on the adjustment block, the first through-hole is formed on the first wear-resistant member, the second through-hole is formed on the second wear-resistant member, and the first through-hole and the second through-hole are both configured to penetrate along a vertical direction.

Optionally, a first limiting flange is provided on an upper portion of the first wear-resistant member, and a second limiting flange is provided on an upper portion of the second wear-resistant member; during installation, the first limiting flange abuts against the housing and is limited thereby, and the second limiting flange abuts against the adjustment block and is limited thereby.

Optionally, a first mounting groove for mounting the first wear-resistant member is provided on the housing, a plurality of first protrusions for tightly fitting against the first wear-resistant member are annularly distributed on an inner wall of the first mounting groove, and a first guiding bevel is provided on an upper end of each of the first protrusions for facilitating mounting of the first wear-resistant member into the first mounting groove; a second mounting groove for mounting the second wear-resistant member is provided on the adjustment block, a plurality of second protrusions are annularly distributed on an inner wall of the second mounting groove for tightly fitting against the second wear-resistant member, and a second guiding bevel is provided on an upper end of each of the second protrusions for facilitating mounting of the second wear-resistant member into the second mounting groove.

Optionally, the deformation portion is an elastic strip capable of being elastically bent, and two deformation portions are symmetrically arranged, and a deformation space for the deformation portions to bend and deform is arranged between the two deformation portions, and a handle block is integrally formed on a lower side of the deformation portions; during adjustment, the handle block is driven by an external force to drive the deformation portion to bend elastically.

Optionally, a first rotating column and a second rotating column are respectively provided on two ends of the shaft sleeve, a first insertion hole corresponding to the first rotating column and a second insertion hole corresponding to the second rotating column are provided on the housing, an elastically deformable mounting plate is arranged on the housing, the second insertion hole is provided on the mounting plate, and a third guiding bevel is provided on the mounting plate for guiding the second rotating column into the second insertion hole.

Optionally, a sliding groove is provided on the lower side of the housing, a slider slidably engaged with the sliding groove is provided on the adjustment block, an opening is formed on a lateral end of the sliding groove, through which the slider slides into the sliding groove.

Optionally, the adjustment block is detachably provided with a first bolt, and after adjustment of the adjustment block, the first bolt is screwed in by an external force so that one end of the first bolt is tightly pressed against the housing to limit the relative sliding between the adjustment block and the housing; a mounting stripe is provided on the housing, the first positioning groove is provided on the mounting stripe, and a limiting protrusion for abutting against the mounting stripe to provide a limiting function is provided on the adjustment block, and a fourth guiding bevel is provided on the limiting protrusion, and when the second through-hole is located directly below the first through-hole, the limiting protrusion abuts against the mounting stripe to provide a limiting function.

Optionally, the blind cord resistance adjustment structure further includes an upper beam bracket, the housing is arranged on a lower side of the upper beam bracket, and a cord winder connected to the rotating shaft is arranged on the lower side of the upper beam bracket, a rotating drum and a coil spring are arranged in the cord winder, the rotating drum is sleeved on the rotating shaft and rotates synchronously with the rotating shaft, and a pull-out end of the coil spring is connected to the rotating drum.

Optionally, the blind cord resistance adjustment structure further includes a first mounting bracket and a second mounting bracket, respectively arranged on two ends of the upper beam bracket, the first mounting bracket is threadedly connected with a mounting screw rod, an end of the mounting screw rod close to an external first wall surface is connected to a first fixing block, the mounting screw rod is capable of rotating circumferentially relative to the first fixing block, and a first anti-slip pad is arranged on a side of the first fixing block close to the first wall surface; the second mounting bracket is provided with a second fixing block and a first elastic member, the second fixing block is slidably arranged on the second mounting bracket along its axial direction, the first elastic member is arranged between the second mounting bracket and the second fixing block, and a second anti-slip pad is provided on a side of the second fixing block close to an external second wall surface; during installation, the elastic force of the first elastic member drives the second fixing block to slide toward the second wall surface, so that the second anti-slip pad abuts against the second wall surface; the mounting screw rod is rotated by an external force to drive the first fixing block to slide toward the first wall surface, so that the second mounting bracket approaches the second fixing block to eventually abut against the second fixing block, the first anti-slip pad abuts against the first wall surface, and the second anti-slip pad abuts against the second wall surface, so that the upper beam bracket is fixed between the first wall surface and the second wall surface.

Optionally, the first elastic member is a first compression spring, one end of the first elastic member abuts against the second fixing block, and the other end of the first elastic member abuts against the second mounting bracket; the elastic force of the first elastic member drives an end of the second fixing block provided with the second anti-slip pad to extend out of the second mounting bracket prior to mounting; the second mounting bracket is provided with a first positioning column on which one end of the first compression spring is sleeved on and positioned, and the second fixing block is provided with a second positioning column on which the other end of the first compression spring is sleeved on and positioned, and the first positioning column abuts against the second positioning column when mounted; the mounting screw rod is provided with an external thread, and the first mounting bracket is provided with an internal thread corresponding to the external thread.

Optionally, a first insertion column is provided on the first fixing block, and a first insertion recess engaged with the first insertion column is provided on the mounting screw rod; a limiting block for limiting the rotation of the first fixing block is provided on the first mounting bracket; a plane bearing is provided between the mounting screw rod and the first fixing block; the first anti-slip pad is made of silicone, rubber, or foam, and the second anti-slip pad is made of silicone, rubber, or foam.

Optionally, an adjustment block is provided on one end of the mounting screw rod, a longitudinal section of the adjustment block is in a shape of a regular polygon, and a plurality of first recesses are provided on the adjustment block, and the first recesses are in an I-shape; the mounting screw rod, the first fixing block, the first anti-slip pad, the second fixing block and the second anti-slip pad are all located on the lower side of the upper beam bracket.

Optionally, the blind cord resistance adjustment structure further includes a cord buckle body and a rotating component arranged on the cord buckle body, one end of the blind cord is connected to the rotating component, the cord buckle body and the rotating component are movably engaged, the rotating component is switchable between a locked state and an unlocked state, and the rotating component is rotatable in the unlocked state. A locking mechanism is arranged between the cord buckle body and the rotating component, and the locking mechanism includes a second elastic member. The second elastic member is arranged between the cord buckle body and the rotating component. In a normal state, the rotating component is driven to engage with the cord buckle body by the elastic force of the second elastic member, so that the rotating component is in the locked state under which it cannot be rotated; during adjustment, the rotating component is driven to disengage from the cord buckle body by an external force, so that the rotating component is in the unlocked state; the rotating component can be rotated forward by an external force to wind the blind cord around the rotating component; the rotating component can be rotated reversely by an external force to release the blind cord from the rotating component.

Optionally, the rotating component is slidably arranged on the cord buckle body along the axial direction, and the locking mechanism further includes a second positioning tooth and a second positioning groove corresponding to the second positioning tooth, the second positioning tooth is arranged on the rotating component, and the rotating component is arranged on the cord buckle body; in a normal state, the elastic force of the second elastic member drives the second positioning tooth to engage with the second positioning groove, so that the rotating component is engaged with the cord buckle body; during adjustment, the rotating component is driven to slide along the axial direction by an external force to disengage the second positioning tooth from the second positioning groove, so that the rotating component is disengaged from the cord buckle body.

Optionally, a plurality of second positioning teeth are evenly distributed along a rotation direction of the rotating component, a plurality of second positioning grooves are evenly distributed along the rotation direction of the rotating component, and a number of the second positioning grooves is greater than or equal to a number of the second positioning teeth.

Optionally, the rotating component includes a rotating rod and an end cover connected to one end of the rotating rod, the rotating rod and the end cover rotate and slide synchronously, the elastic member abuts between the rotating rod and the cord buckle body, the second positioning tooth is arranged on the end cover, and a manual knob is arranged on one end of the rotating component; during adjustment, the manual knob is rotated under an external force, so as to drive the rotating component to rotate.

Optionally, the cord buckle body is provided with an inner cavity for mounting the rotating component, the cord buckle body is provided with a third through-hole and a fourth through-hole communicated with the inner cavity, and the rotating component is provided with a fifth through-hole; when mounting the blind cord, one end of the blind cord passes through the third through-hole, the fifth through-hole and the fourth through-hole in sequence, and a limiting portion is provided at a position where the blind cord passes through the fourth through-hole, a diameter of the limiting portion is larger than a diameter of the fifth through-hole, and the diameter of the limiting portion is smaller than a diameter of the fourth through-hole, so that the limiting portion passes through the fourth through-hole and is limited at the fifth through-hole; the rotating component is provided with a second recess for limiting the limiting portion.

Optionally, the blind cord resistance adjustment structure further includes a lower beam bracket, two cord buckle bodies and two blind cords are provided, and the cord buckle bodies are fixedly connected to the lower beam bracket; and each cord buckle body is provided with a corresponding rotating component; the second elastic member is a second compression spring, one end of the second elastic member abuts against a corresponding cord buckle body, and the other end of the second elastic member abuts against the corresponding rotating component.

Compared with the existing technology, the blind cord resistance adjustment structure in the present disclosure is provided with an adjustment block. The horizontal distance between the first through-hole and the second through-hole is adjusted by sliding the adjustment block, thereby adjusting the friction applied to the blind cord. This enables convenient adjustment of friction resistance on the blind cord according to the weight of the blind fabric, thereby making it suitable for fabrics of varying weights. It also improves the accuracy of positioning when adjusting the height of the blind, providing a better user experience. The first wear-resistant member and the second wear-resistant member are provided to rub against the blind cord, avoiding direct friction between the housing and the adjustment block and the blind cord, thereby preventing damage to the housing and the adjustment block due to excessive wear and extending the service life. The adjustment block is detachably arranged with a first bolt to prevent the adjustment block from accidentally slipping out of the first positioning groove due to factors such as excessive curtain weight or wear and deformation of the first positioning teeth during use, thereby ensuring more reliable operation.

In addition, the present disclosure further provides a blind, including the above-mentioned blind cord resistance adjustment structure. The blind also has the beneficial effects of the above-mentioned blind cord resistance adjustment structure, which will not be repeated herein.

Figure 1:
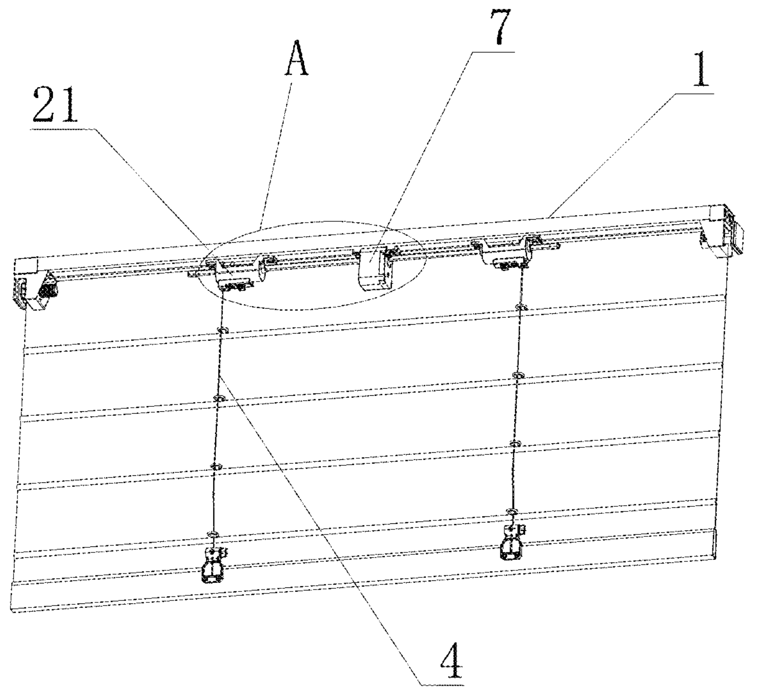
FIG. 1 is a perspective view of a blind cord resistance adjustment structure of the present disclosure.

Reference signs in the figures are as follows: 1, upper beam bracket; 21, housing; 210, first through-hole; 211, first positioning groove; 212, first mounting groove; 213, first protrusion; 214, first guiding bevel; 215, first insertion hole; 216, second insertion hole; 217, mounting plate; 218, third guiding bevel; 219, mounting stripe; 22, rotating shaft; 23, shaft sleeve; 231, first rotating column; 232, second rotating column; 3, adjustment block; 31, second through-hole; 32, deformation portion; 320, deformation space; 321, first positioning tooth; 322, handle block; 33, second mounting groove; 331, second protrusion; 332, second guiding bevel; 34, slider; 35, limiting protrusion; 351, fourth guiding bevel; 4, blind cord; 4101, first wall surface; 4102, second wall surface; 42, first mounting bracket; 4201, internal thread; 4202, limiting block; 43, second mounting bracket; 431, first positioning column; 44, mounting screw rod; 4401, external thread; 4402, first insertion recess; 4403, adjustment block; 4404, first recess; 45, first fixing block; 4501, first insertion column; 46, first anti-slip pad; 47, second fixing block; 471, second positioning column; 48, first elastic member; 49, second anti-slip pad; 410, plane bearing; 5, first wear-resistant member; 51, first limiting flange; 5101, limiting portion; 52, cord buckle body; 5201, second positioning groove; 5202, inner cavity; 5203, third through-hole; 5204, fourth through-hole; 53, rotating component; 5301, second positioning tooth; 5302, manual knob; 5303, fifth through-hole; 5304, second recess; 531, rotating rod; 5311, second insertion column; 532, end cover; 5321, second insertion recess; 5322, flange; 54, second elastic member; 55, lower beam bracket; 56, second bolt; 6, second wear-resistant member; 61, second limiting flange; 7, cord winder; 71, rotating drum; 72, coil spring; 8, sliding groove; 81, opening; 9, first bolt; 10, motor; 11, blind fabric; L, first distance; and M, second distance.

DETAILED DESCRIPTION OF EMBODIMENTS

In order to make the above-mentioned objects, features and advantages of the present disclosure clearer and easy to understand, specific embodiments of the present disclosure are described in detail below with reference to the accompanying drawings.

In the description of the present disclosure, it should be understood that the orientation or position relationship indicated by the terms "upper", "lower" and the like is based on the orientation or position relationship in the normal operation of the product.

The terms "first" and "second" are used for descriptive purposes only and should not be understood as indicating or implying relative importance or implicitly indicating the number of the indicated technical features. Therefore, the features defined as "first" and "second" may explicitly or implicitly include at least one of the features.

First Embodiment

Referring to FIGS. 1 to 11, a blind cord resistance adjustment structure is provided in the first embodiment of the present disclosure, including a cord-winding shaft assembly, an adjustment block 3 and a blind cord 4, the cord-winding shaft assembly includes a housing 21, a rotating shaft 22 and a shaft sleeve 23, the shaft sleeve 23 is rotatably mounted in the housing 21 along its circumferential direction, the shaft sleeve 23 is sleeved on the rotating shaft 22 and rotates synchronously with the rotating shaft 22. The upper end of the blind cord 4 is connected to the shaft sleeve 23, and the blind cord 4 is wound or released by the rotation of the shaft sleeve 23. The adjustment block 3 is slidably arranged on the lower side of the housing 21 along the horizontal direction or the nearly horizontal direction, the housing 21 is provided with a first through-hole 210 for the blind cord 4 to pass through, the adjustment block 3 is provided with a second through-hole 31 for the blind cord 4 to pass through. The adjustment block 3 is provided with an elastically deformable deformation portion 32, the deformation portion 32 is provided with first positioning teeth 321, the housing 21 is provided with a plurality of first positioning grooves 211 corresponding to the first positioning teeth 321, and the plurality of first positioning grooves 211 are distributed along the sliding direction of the adjustment block 3.

During adjustment, the deformation portion 32 is elastically deformed by an external force to drive the first positioning teeth 321 to disengage from the respective first positioning grooves 211, and the adjustment block 3 is driven to slide by the external force to adjust the horizontal distance between the first through-hole 210 and the second through-hole 31, so as to adjust the friction between the blind cord 4 and the inner wall of the first through-hole 210, as well as the friction between the blind cord 4 and the inner wall of the second through-hole 31. After the adjustment is completed, the external force is removed, and the deformation portion 32 is restored under its own elasticity, so that the first positioning teeth 321 are engaged with and positioned in the corresponding first positioning grooves 211. The greater the horizontal distance between the first through-hole 210 and the second through-hole 31 increases, that is, the more inclined the blind cord 4 between the first through-hole 210 and the second through-hole 31 is relative to the vertical direction, the greater the frictional resistance applied to the blind cord 4. Conversely, when the horizontal distance between the first through-hole 210 and the second through-hole 31 becomes smaller, the frictional resistance applied to the blind cord 4 is also reduced; when the second through-hole 31 is located directly below the first through-hole 210, that is, the horizontal distance between the first through-hole 210 and the second through-hole 31 tends to zero, the blind cord 4 between the first through-hole 210 and the second through-hole 31 is in a vertical state or a substantially vertical state, at which point the frictional resistance of the inner wall of the first through-hole 210 and the inner wall of the second through-hole 31 to the blind cord 4 is the smallest. In this embodiment, two blind cords 4 are provided, and two cord-winding shaft assemblies and adjustment blocks 3 are provided accordingly, and the frictional resistance of the corresponding blind cords 4 is adjusted respectively by the two adjustment blocks 3.

Figure 4:
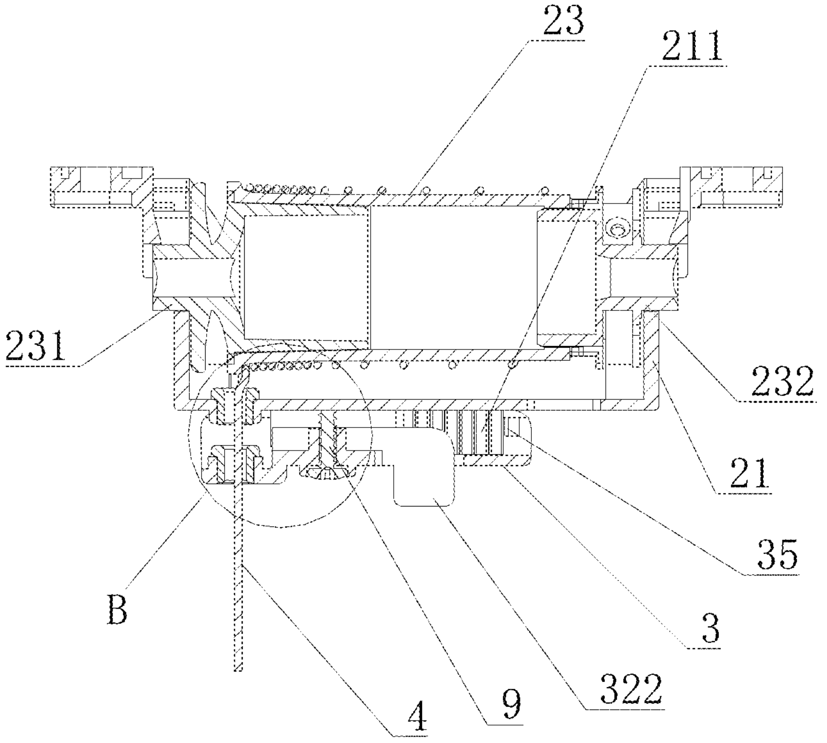
FIG. 4 is a schematic structural diagram of a cord-winding shaft assembly of the blind cord resistance adjustment structure according to the present disclosure.
Figure 5:
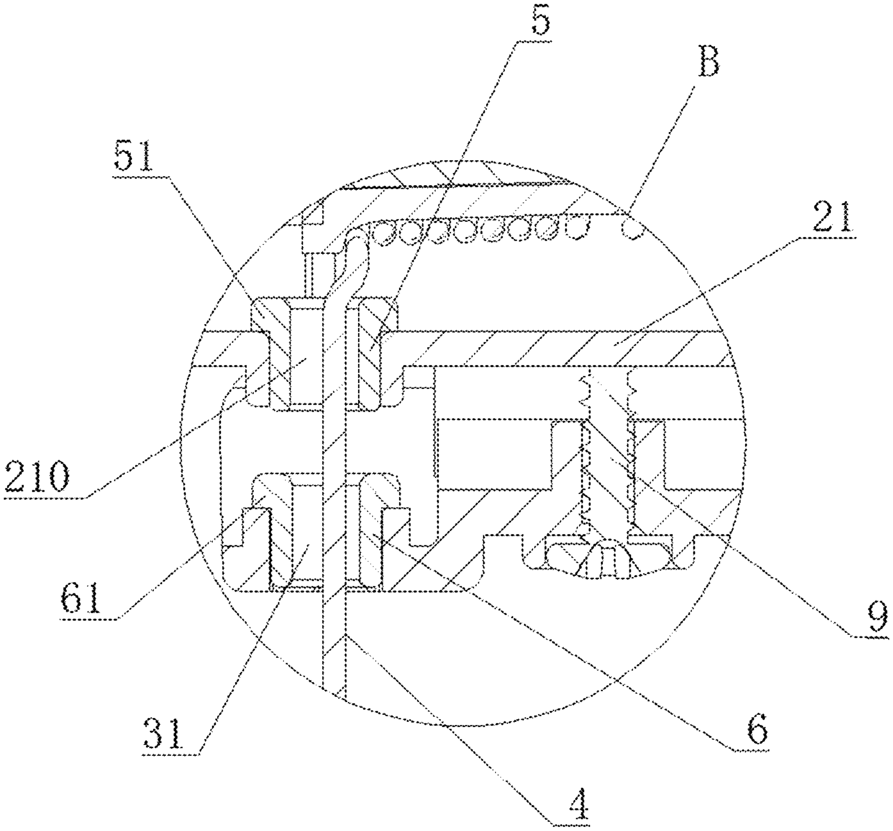
FIG. 5 is an enlarged view of area B in FIG. 4.
Figure 6:
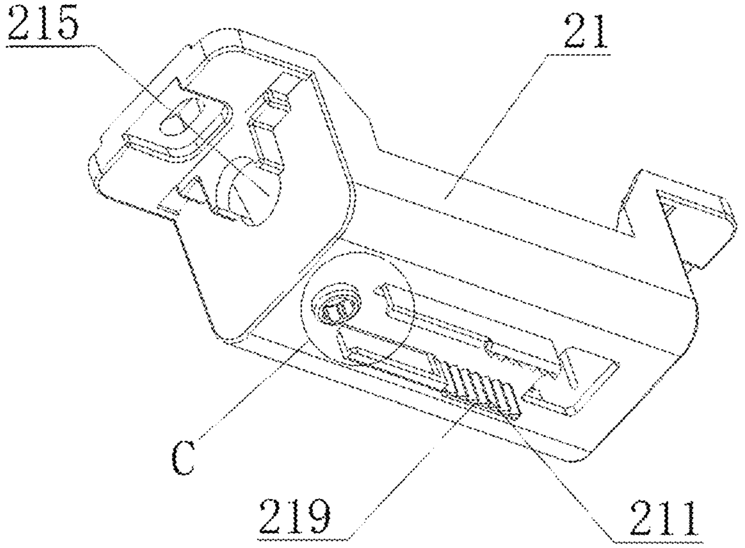
FIG. 6 is a first structural diagram of a housing of the blind cord resistance adjustment structure of the present disclosure.
Figure 7:
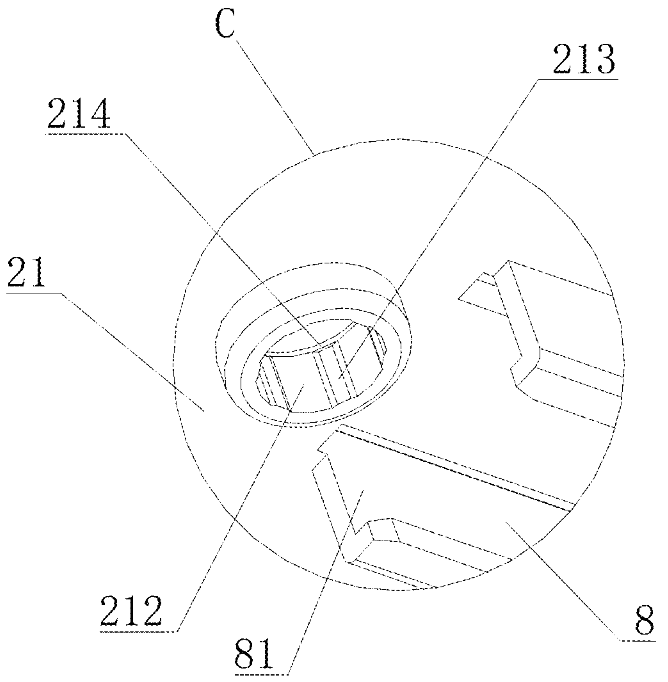
FIG. 7 is an enlarged view of area C in FIG. 6.
Figure 8:
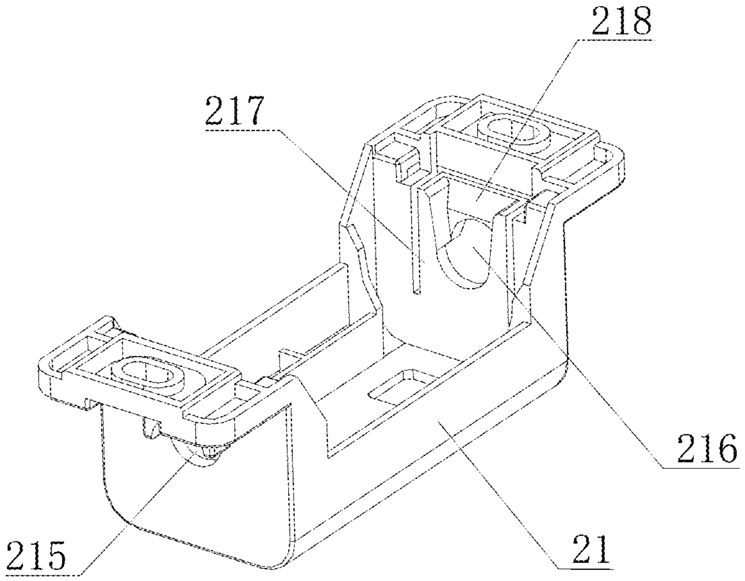
FIG. 8 is a second structural diagram of the housing of the blind cord resistance adjustment structure of the present disclosure.

Referring to FIG. 4, the second through-hole 31 is located directly below the first through-hole 210, and the frictional resistance to the blind cord is the smallest. When the adjustment block 3 is driven to slide horizontally to the right, the frictional resistance to the blind cord becomes larger. The further the adjustment block 3 is moved to the right, the greater the frictional resistance to the blind cord.

Referring to FIGS. 1 to 5, a first wear-resistant member 5 is provided on the housing 21, and a second wear-resistant member 6 is provided on the adjustment block 3. The first through-hole 210 is formed on the first wear-resistant member 5, and the second through-hole 31 is formed on the second wear-resistant member 6. The first through-hole 210 and the second through-hole 31 are both configured to penetrate in the vertical direction. By arranging the first wear-resistant member 5 and the second wear-resistant member 6 to rub against the blind cord, the housing 21 and the adjustment block 3 are prevented from directly rubbing against the blind cord, thus the housing 21 and the adjustment block 3 are prevented from being damaged due to excessive wear, thereby extending the service life. It is worth noting that using wear-resistant materials for the housing 21 and the adjustment block 3 can also reduce wear, but this approach results in higher production costs. By arranging the wear-resistant members on the housing 21 and the adjustment block 3, wear is reduced; this allows a more reasonable structure and lower cost, which is the preferred option.

Referring to FIGS. 4, 5, 6, 7 and 9, a first limiting flange 51 is provided on the upper portion of the first wear-resistant member 5, and a second limiting flange 61 is provided on the upper portion of the second wear-resistant member 6. During installation, the first limiting flange 51 abuts against the housing 213 to limit its own position, and the second limiting flange 61 abuts against the adjustment block 3 to limit its own position. After installation, the first wear-resistant member 5 and the second wear-resistant member 6 are not easily displaced, resulting in a stable structure. A first mounting groove 212 for mounting the first wear-resistant member 5 is provided on the housing 21, a plurality of first protrusions 213 are annularly distributed on the inner wall of the first mounting groove 212 for closely fitting with the first wear-resistant member 5. The upper end of each first protrusion 213 is provided with a first guiding bevel 214 for facilitating insertion of the first wear-resistant member 5 into the first mounting groove 212, thereby reducing assembly difficulty. During installation, the first wear-resistant member 5 is mounted into the first mounting groove 212 from top to bottom, allowing an easy installation of the first wear-resistant member 5 and a stable structure after assembly. A second mounting groove 33 for mounting the second wear-resistant member 6 is provided on the adjustment block 3, a plurality of second protrusions 331 are annularly distributed on the inner wall of the second mounting groove 33 for closely fitting with the second wear-resistant member 6. The upper end of each second protrusion 331 is provided with a second guiding bevel 332 for facilitating the insertion of the second wear-resistant member 6 into the second mounting groove 33, thereby reducing the assembly difficulty. During installation, the second wear-resistant member 6 is mounted into the second mounting groove 33 from top to bottom, allowing an easy installation of the second wear-resistant member 6 and a stable structure after assembly. The first wear-resistant member 5 and the second wear-resistant member 6 are both made of a ceramic material, which has good wear resistance and is more durable. The first wear-resistant member 5 and the second wear-resistant member 6 can also be made of other materials such as plastic or metal which has good wear resistance. Since the first wear-resistant member 5 and the second wear-resistant member 6 need to rub with the blind cord to provide resistance, the surfaces of the first wear-resistant member 5 and the second wear-resistant member 6 can also be treated with sanding or other surface roughening processes to increase the coefficient of friction, thereby enhancing the resistance effect. The inner wall of the above-mentioned first through-hole 210 includes the opening of the first through-hole 210, and the inner wall of the second through-hole 31 includes the opening of the second through-hole 31.

Figure 3:
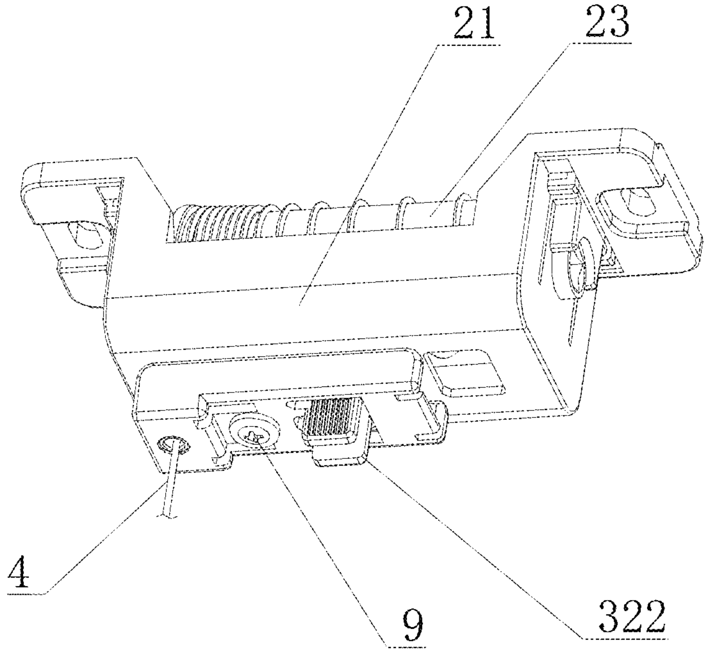
FIG. 3 is a schematic structural diagram of a cord-winding shaft assembly of the blind cord resistance adjustment structure according to the present disclosure.
Figure 9:
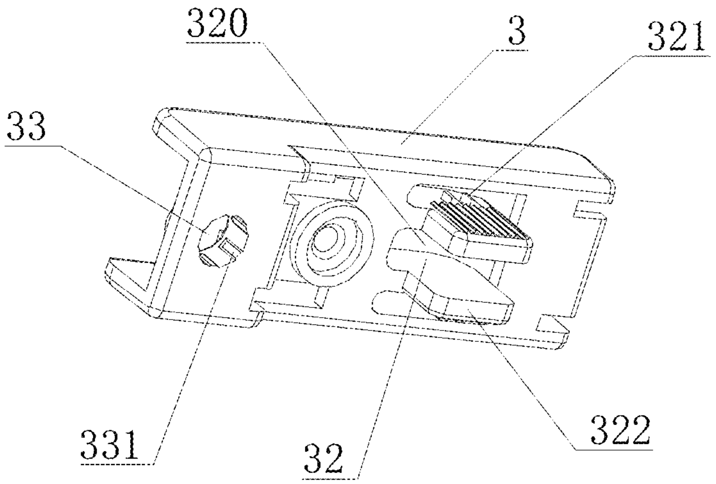
FIG. 9 is a first structural diagram of an adjustment block of the blind cord resistance adjustment structure according to the present disclosure.

Referring to FIGS. 3, 4 and 9, in this embodiment, the deformation portion 32 is an elastic strip that can be elastically bent. The deformation portion 32 may also be formed in other structures that can be elastically bent, such as an elastic plate, an elastic sheet, and the like. Two deformation portions 32 are symmetrically arranged, and a deformation space 320 allowing the deformation portion 32 to bend and deform is arranged between the two deformation portions 32. Handle blocks 322 are integrally formed on the lower side of the deformation portions 32. During adjustment, an external force is applied to drive the handle blocks 322, causing the deformable portions 32 to undergo elastic bending. Specifically, the user pinches the two handle blocks 322 with the index finger and thumb, pressing them toward the deformation space 320. This causes the two deformable portions 32 to bend toward the deformation space 320, allowing the first positioning teeth 321 to disengage from the corresponding first positioning grooves 211. At this point, the adjustment block 3 can be moved to the desired position by sliding it via the handle blocks 322. Once the user releases the handles, the deformable portions 32 elastically return to their original shape, and the first positioning teeth 321 re-engage with the corresponding positioning grooves 211 to secure the position. This design enables easy and convenient adjustment.

Figure 2:
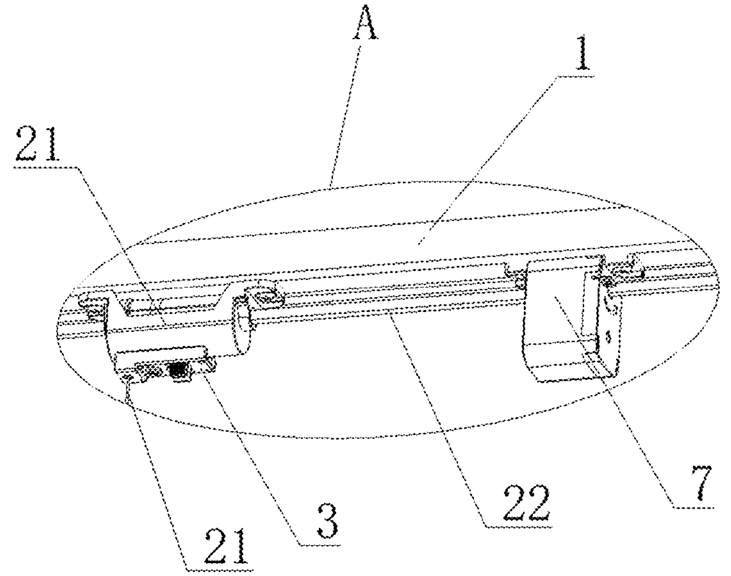
FIG. 2 is an enlarged view of area A in FIG. 1.
Figure 11:
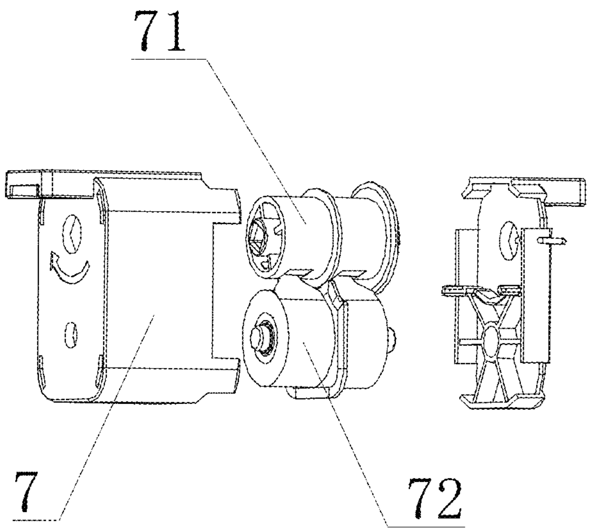
FIG. 11 is an exploded view of a cord winder of the blind cord resistance adjustment structure of the present disclosure.

Referring to FIGS. 1, 2 and 11, the blind cord resistance adjustment structure further includes an upper beam bracket 1, a housing 21 is fixedly arranged on the lower side of the upper beam bracket 1 by means of bolts. A cord winder 7 connected to the rotating shaft 22 is fixedly arranged on the lower side of the upper beam bracket 1. A rotating drum 71 and a coil spring 72 are arranged inside the cord winder 7, the rotating drum 71 is sleeved on the rotating shaft 22 and rotates synchronously with the rotating shaft 22, a pulled-out end of the coil spring 72 is connected to the rotating drum 71. The gravity of the blind fabric is balanced by the combined force of the elastic force of the coil spring 72, the friction force between the first wear-resistant member and the blind cord, and the friction force between the second wear-resistant member and the blind cord, resulting in an excellent balancing effect. The blind fabric is not prone to displacement after adjusting the height, so that the positioning is more accurate, providing a better user experience. The first rotating column 231 and the second rotating column 232 are respectively arranged at two ends of the shaft sleeve 23, and the housing 21 is provided with a first insertion hole 215 corresponding to the first rotating column 231 and a second insertion hole 216 corresponding to the second rotating column 232. An elastically deformable mounting plate 217 is provided on the housing 21. The second insertion hole 216 is provided on the mounting plate 217. The mounting plate 217 is provided with a third guiding bevel 218 for facilitating the insertion of the second rotating column 232 into the second insertion hole 216, thereby reducing the difficulty of assembly. When mounting the shaft sleeve 23, the first rotating column 231 is first rotatably inserted into the first insertion hole 215, and then the second rotating column 232 is pressed against the mounting plate 217 to bend the mounting plate 217, so that the second rotating column 232 can be smoothly mounted into the second insertion hole 216. The mounting plate 217 restores under elastic deformation after the shaft sleeve is mounted, which is convenient for assembly.

Referring to FIGS. 4, 6, 7 and 10, a sliding groove 8 is provided on the lower side of the housing 21, and a slider 34 is provided on the adjustment block 3 to slidably engage with the sliding groove 8, ensuring a smooth slide of the adjustment block 3. An opening 81 is provided on a lateral end of the sliding groove 8, and the slider 34 enters the sliding groove 8 from the opening 81, so that the adjustment block 3 is easy to assemble.

Figure 10:
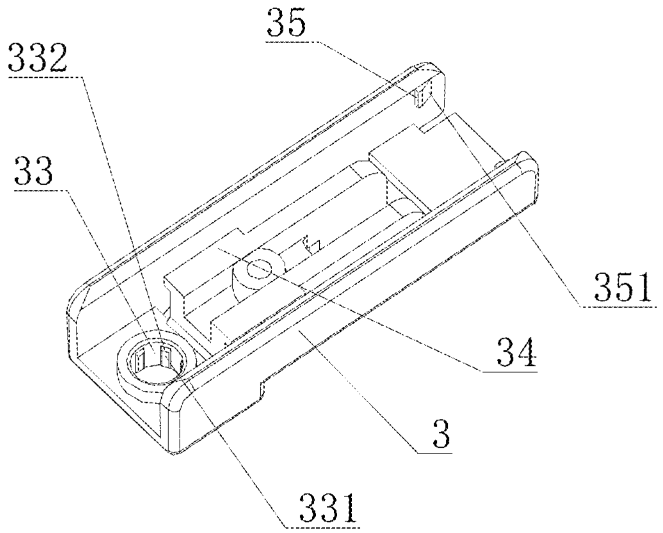
FIG. 10 is a second structural diagram of the adjustment block of the blind cord resistance adjustment structure according to the present disclosure.

Referring to FIGS. 3, 4 and 10, the adjustment block 3 is detachably provided with a first bolt 9. After the adjustment block 3 is adjusted, the first bolt 9 is screwed in by an external force so that one end of the first bolt 9 is pressed against the housing 21. In this embodiment, the upper end of the first bolt 9 is pressed against the housing 21 to limit the relative sliding between the adjustment block 3 and the housing 21. This prevents the adjustment block 3 from accidentally slipping out of the first positioning grooves 211 caused by the tension in the blind cord due to factors such as excessive weight of the blind or wear and deformation of the first positioning teeth 321, ensuring reliability of use. When adjustment is required, the first bolt 9 is unscrewed, and the two handle blocks 322 are pressed to drive the adjustment block 3 to slide. A mounting strip 219 is provided on the housing 21, and the first positioning grooves 211 are provided on the mounting strip 219. A limiting protrusion 35 for abutting against the mounting strip 219 is provided on the adjustment block 3. The limiting protrusion 35 is provided with a fourth guiding bevel 351 for facilitating the mounting of the adjustment block 3. When the second through-hole 31 is located directly below the first through-hole 210, that is, at the initial position, the limiting protrusion 35 abuts against the mounting strip 219 for limiting the position, so as to prevent the adjustment block 3 from directly sliding out of the housing 21 and falling off.

Embodiment 2

Figure 12:
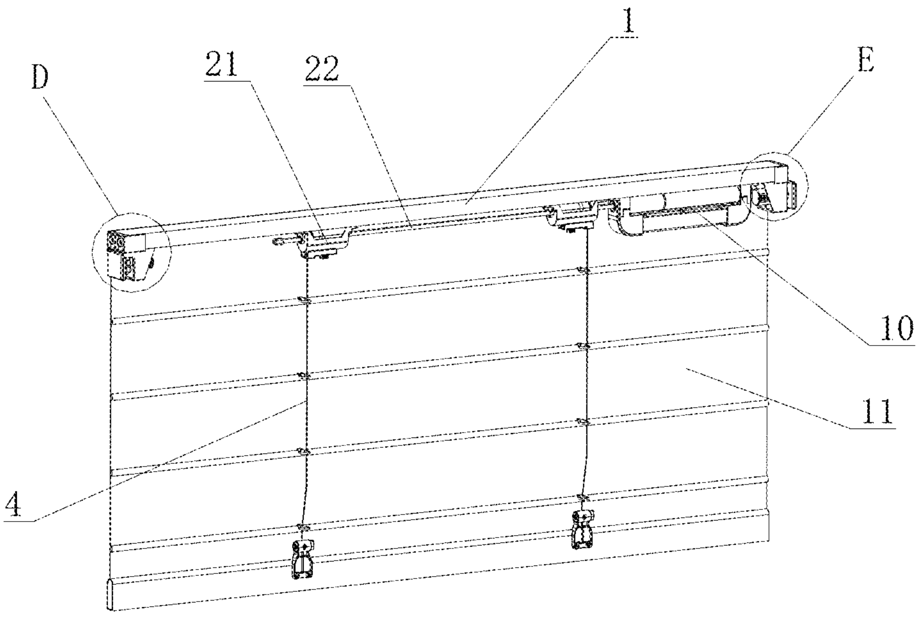
FIG. 12 is a schematic structural diagram of a second embodiment of the blind cord resistance adjustment structure according to the present disclosure.

Referring to FIG. 12, the difference between the second embodiment and the first embodiment is as follows: in the first embodiment, the blind cord resistance adjustment structure is applied to manual Roman blinds, and the second embodiment provides a blind cord resistance adjustment structure adapted for electric Roman blinds. Specifically, in the second embodiment, the rotating shaft 22 is driven to rotate by a motor 10 with a self-locking function, and the blind cord is wound or released by the forward and reverse rotation of the motor 10, thereby realizing the adjustment of the position of the blind fabric. In the second embodiment, it is only necessary to slide the adjustment block 3 so that the second through-hole 31 is located directly below the first through-hole 210. At this position, when the motor 10 winds the blind cord, the resistance applied to the blind cord by the first wear-resistant member and the second wear-resistant member is adjusted to the minimum, thereby avoiding increasing the power consumption of the motor and ensuring a wide range of applicability. The following structure is described based on the second embodiment; however, the structure described below can also be applied to the first embodiment.

Referring to FIGS. 12-20, the blind cord resistance adjustment structure further includes a first mounting bracket 42 and a second mounting bracket 43, respectively arranged on either end of the upper beam bracket 1. The first mounting bracket 42 is threadedly connected with a mounting screw rod 44, and an end of the mounting screw rod 44 close to the external first wall surface 4101 is connected with a first fixing block 45. The mounting screw rod 44 is circumferentially rotatable relative to the first fixing block 45. A first anti-slip pad 46 is bonded to a side of the first fixing block 45 close to the first wall surface 4101. A second fixing block 47 and a first elastic member 48 are arranged on the second mounting bracket 43, the second fixing block 47 is slidably arranged on the second mounting bracket 43 along its axial direction (i.e., the horizontal direction), and the first elastic member 48 is arranged between the second mounting bracket 43 and the second fixing block 47. A second anti-slip pad 49 is bonded to a side of the second fixing block 47 close to an external second wall surface 4102. During installation, the second fixing block 47 is driven toward the second wall surface 4102 by the elastic force of the first elastic member 48, so that the second anti-slip pad 49 abuts against the second wall surface 4102, and the elastic force of the first elastic member 48 facilitates the second anti-slip pad 49 to be pressed against the second wall surface 4102, avoiding the second anti-slip pad 49 from falling off from the second wall surface 4102 due to insufficient pressing force during installation; and then the mounting screw rod 44 is rotated by an external force so that the mounting screw rod 44 drives the first fixing block 45 to slide toward the first wall surface 4101, and the second mounting bracket 43 moves toward the second fixing block 47, eventually abutting against the second fixing block 47. This allows the first anti-slip pad 46 to abut against the first wall surface 4101, and the second anti-slip pad 49 to abut against the second wall surface 4102, and the rotation of the mounting screw rod 44 is stopped after the abutments, so that the upper beam bracket 1 is fixed between the first wall surface 4101 and the second wall surface 4102 to complete the installation of the blind, allowing an easy installation. When disassembling, the mounting screw rod 44 only needs to be rotated in the opposite direction (opposite to the direction during installation).

Specifically, the operating sequence of the components during the installation of the punch-free mounting structure is described as follows: first, the second fixing block 47 is attached to the second wall surface 4102 (at this stage, the second fixing block 47 is not yet in contact with the second mounting bracket 43; however, if the second fixing block 47 is already in contact with the second mounting bracket 43 at this point, it does not affect the subsequent assembly steps), and then the mounting screw rod 44 is rotated to drive the first fixing block 45 to move away from the first mounting bracket 42, thereby pressing the first anti-slip pad 46 against the first wall surface 4101. The mounting screw rod 44 is further rotated, and the first fixing block 45 continues to extend out; meanwhile, the second fixing block 45 and the second mounting bracket 43 move toward each other, and finally, the second fixing block 45 and the second mounting bracket 43 are in contact. At this point, there is no space for the mounting screw rod 44 to extend further, and the installation is completed by continuing to tighten the mounting screw rod 44. This fixes the upper beam bracket 41 between the first wall surface 4101 and the second wall surface 4102 to complete the installation of the blind.

Referring to FIGS. 12, 14, 15 and 17, the first elastic member 48 is a first compression spring, which has a simple structure and low production cost. One end of the first elastic member 48 abuts against the second fixing block 47, and the other end of the first elastic member 48 abuts against the second mounting bracket 43. Before installation, the elastic force of the first elastic member 48 drives the end of the second fixing block 47 provided with the second anti-slip pad 49 to extend out of the second mounting bracket 43, so that the extended part can abut against the second wall surface 4102 during installation, thereby reducing the difficulty of installation. The second mounting bracket 43 is provided with a first positioning column 431 for fitting and positioning one end of the compression spring, and the second fixing block 47 is provided with a second positioning column 471 for fitting and positioning the other end of the compression spring, preventing the displacement of the compression spring once mounted and ensuring the reliability during use. After the blind is mounted, the first positioning column 431 abuts against the second positioning column 471.

Figure 16:
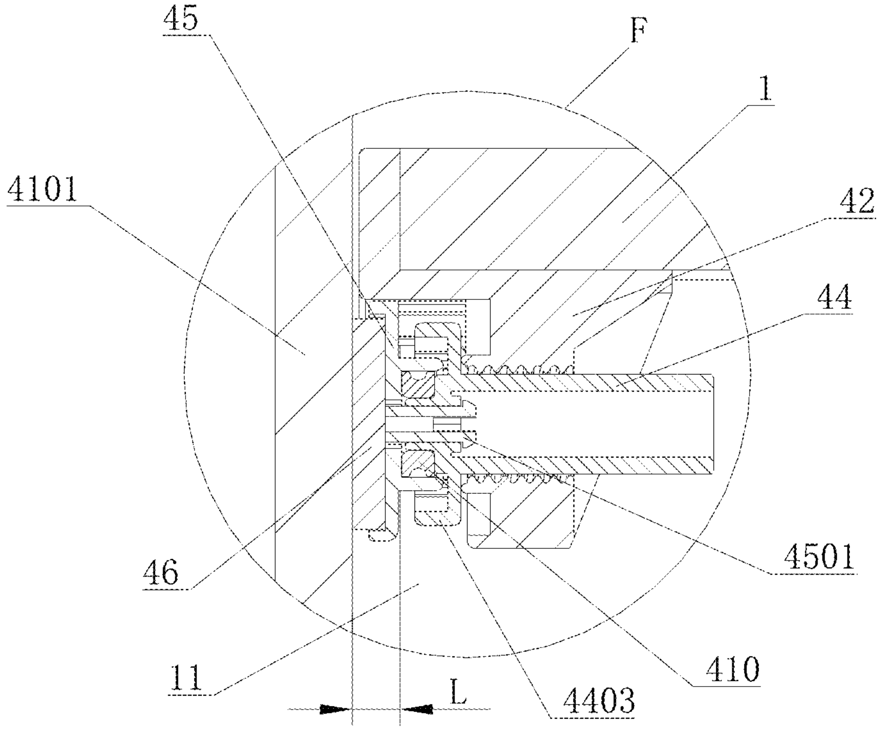
FIG. 16 is an enlarged view of area F in FIG. 15.
Figure 17:
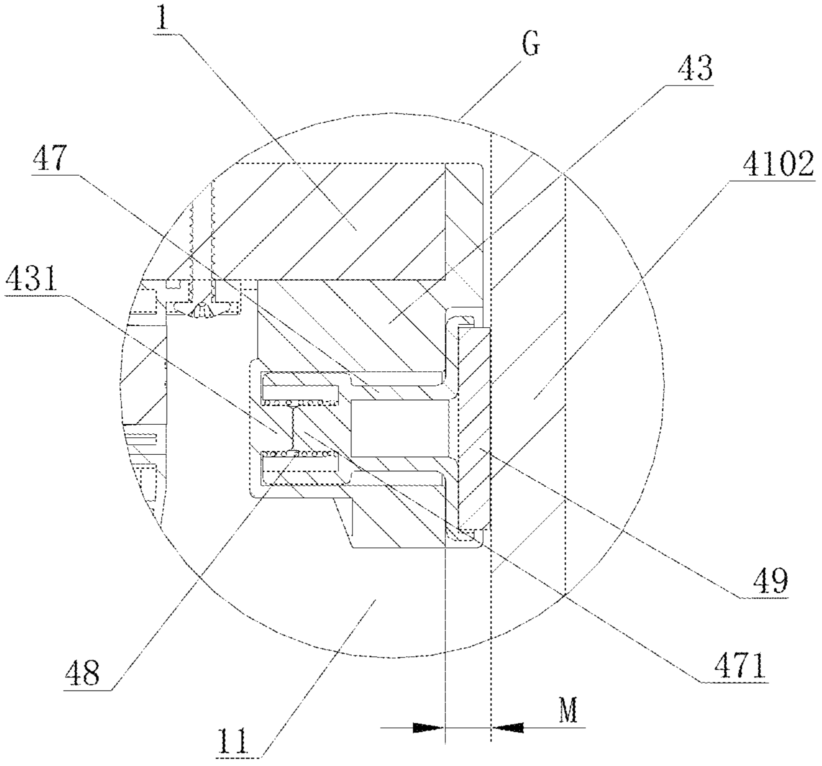
FIG. 17 is an enlarged view of area G in FIG. 15.
Figure 18:
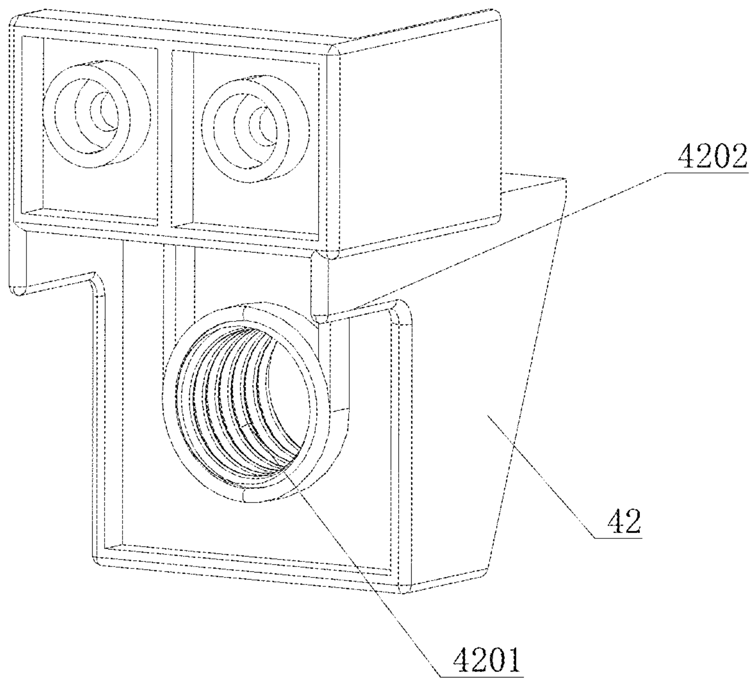
FIG. 18 is a schematic structural diagram of a first mounting bracket of the blind cord resistance adjustment structure according to the present disclosure.
Figure 19:
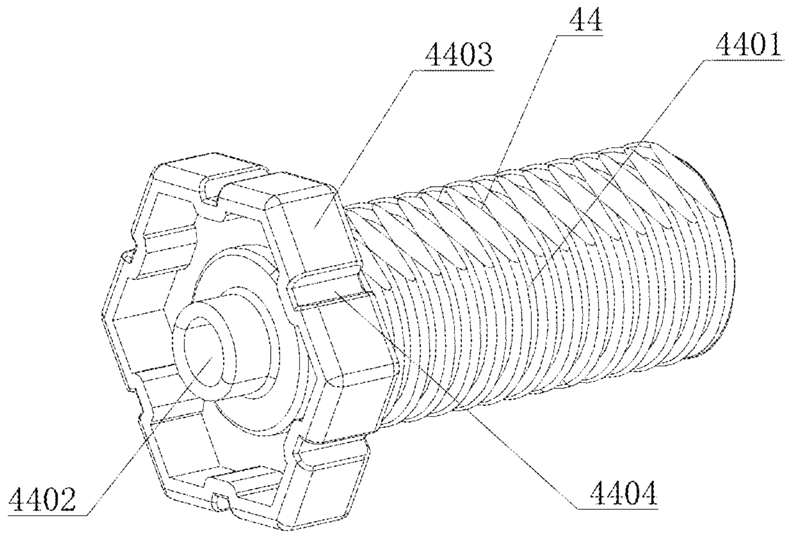
FIG. 19 is a schematic structural diagram of a mounting screw rod of the blind cord resistance adjustment structure of the present disclosure.

Referring to FIGS. 16, 18 and 19, an external thread 4401 is provided on the mounting screw rod 44, and an internal thread 4201 corresponding to the external thread 4401 is provided on the first mounting bracket 2. The mounting screw rod 44 is rotated to enable the mounting screw rod 44 to be displaced in the axial direction, thereby driving the first fixing block 45 to be synchronously displaced in the axial direction. During installation, the mounting screw rod 44 is rotated to drive the first fixing block 45 to slide toward the first wall surface 4101, so that the first anti-slip pad 46 abuts against the first wall surface 4101 to complete the installation, allowing a reasonable structure and easy installation.

Referring to FIGS. 12, 15, 16, 19 and 20, a first insertion column 4501 is provided on the first fixing block 45, and a first insertion recess 4402 engageable with the first insertion column 4501 is provided on the mounting screw rod 44. The first fixing block 45 and the mounting screw rod 44 are assembled through insertion, resulting in a simple assembly. The first insertion column 4501 is circumferentially rotatable in the first insertion recess 4402, so that the mounting screw rod 44 is circumferentially rotatable relative to the first fixing block 45, preventing the circumferential rotation of the first fixing block 45 when mounting the mounting screw rod 44 during installation.

Figure 20:
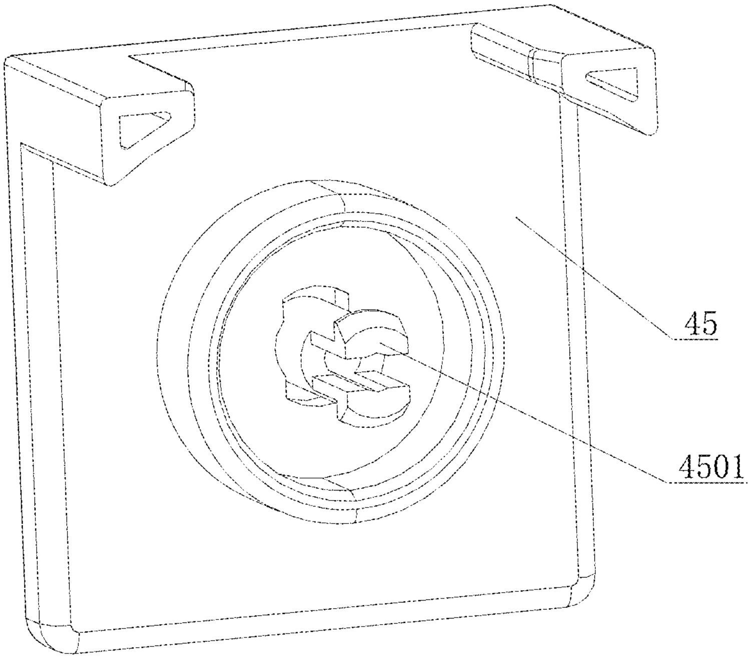
FIG. 20 is a schematic structural diagram of a first fixing block of the blind cord resistance adjustment structure according to the present disclosure.

Referring to FIGS. 16, 18 and 20, a limiting block 4202 for limiting the rotation of the first fixing block 45 is provided on the first mounting bracket 42, so that the first fixing block 45 will not be rotated circumferentially by the mounting screw rod 44 during installation. A plane bearing 410 is provided between the mounting screw rod 44 and the first fixing block 45, so that the mounting screw rod 44 can rotate smoothly relative to the first fixing block 45. During installation, the mounting screw rod 44 drives the first fixing block 45 to slide toward the first wall surface 4101 so that the first fixing block 45 and the first wall surface 4101 are pressed against each other; the greater the pressing force, the greater the friction between the first wall surface 4101 and the first anti-slip pad 46 (making the installation more stable), and the greater the reaction force (resistance) exerted by the first wall surface 4101 on the first fixing block 45. This reaction force is borne by the plane bearing 410, which has a high axial load capacity, avoids structural damage, thereby preventing structural damage and ensuring a longer service life.

Figure 13:
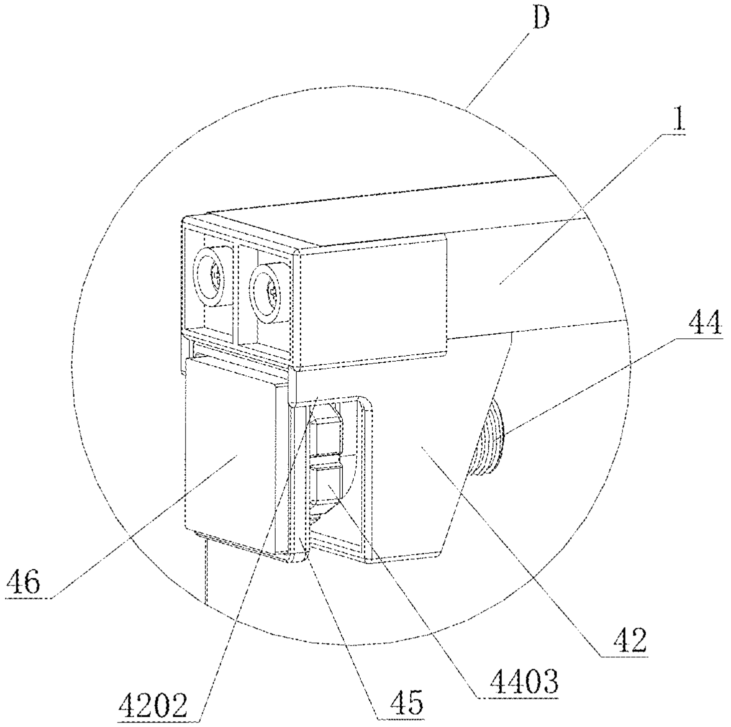
FIG. 13 is an enlarged view of area D in FIG. 12.
Figure 14:
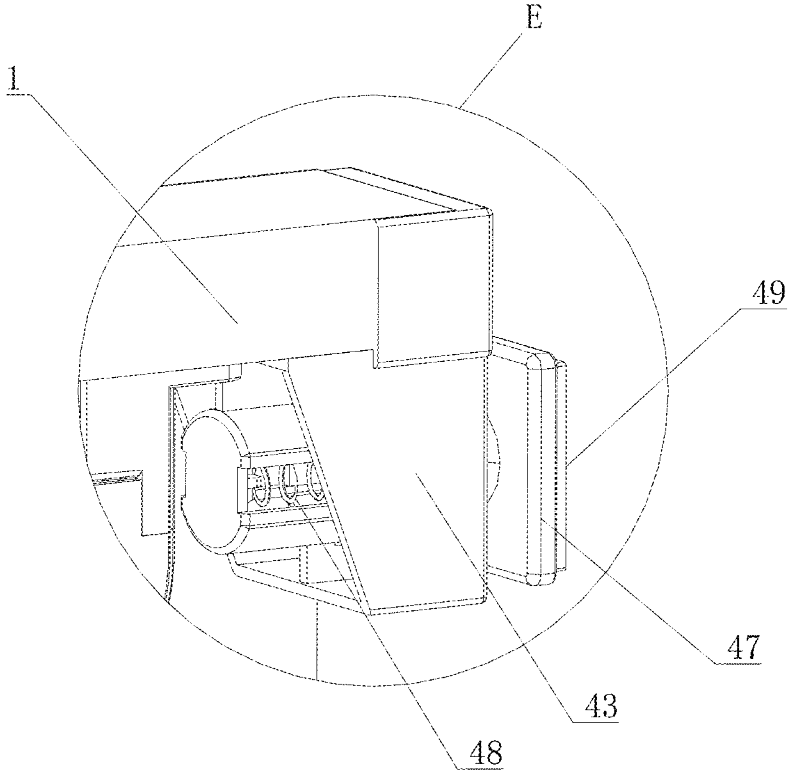
FIG. 14 is an enlarged view of area E in FIG. 12.
Figure 15:
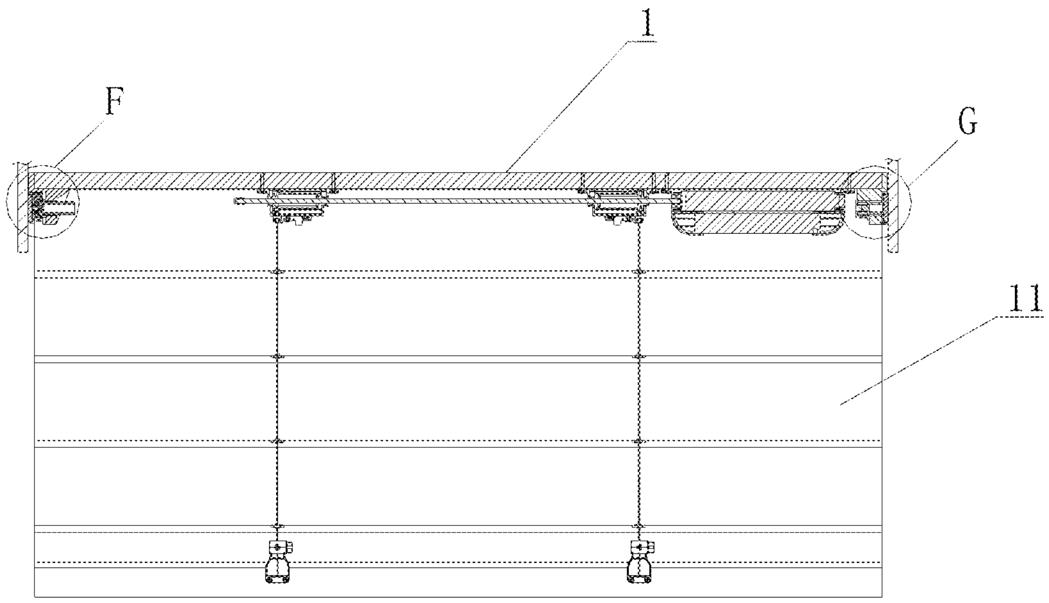
FIG. 15 is a cross-sectional view of the second embodiment of the blind cord resistance adjustment structure of the present disclosure.

Referring to FIGS. 12-14, the first anti-slip pad 46 is made of silicone, rubber, or foam, and the second anti-slip pad 49 is made of silicone, rubber, or foam for a good anti-slip effect. The fixation of the upper beam bracket 1 is achieved through the friction between the first anti-slip pad 46 and the first wall surface 4101 and the friction between the second anti-slip pad 49 and the second wall surface 4102. The first anti-slip pad 46 and the second anti-slip pad 49 may also be made of other materials with good anti-slip properties.

Referring to FIGS. 12, 15, 16 and 19, an adjustment block 4403 is integrally formed on one end of the mounting screw rod 44. The longitudinal section of the adjustment block 4403 has a shape of a regular polygon. In the present embodiment, the adjustment block 4403 is a regular hexagon. The adjustment block 4403 can be rotated by a tool such as an Allen wrench to complete the installation process. A plurality of first recesses 4404 are provided on the adjustment block 4403. The first recesses 4404 are in an I-shape. In the present embodiment, one first recess 4404 is provided on each edge of the adjustment block 4403. The adjustment block 4403 can also be rotated by a tool such as a flat-head screwdriver. This is achieved as follows: the tip of the flat-head screwdriver is inserted into the first recess 4404, and the adjustment block 4403 is rotated by the flat-head screwdriver. This allows for multiple adjustment methods and offers flexible operation.

Referring to FIGS. 12 to 17, the mounting screw rod 44, the first fixing block 45, the first anti-slip pad 46, the second fixing block 47 and the second anti-slip pad 49 are all placed on the lower side of the upper beam bracket 1, that is, the height positions of the mounting screw rod 44, the first fixing block 45, the first anti-slip pad 46, the second fixing block 47 and the second anti-slip pad 49 are all lower than the height position of the upper beam bracket 1, so as to avoid the above-mentioned structure and the upper beam bracket 1 being arranged at the same horizontal height position, thereby avoiding excessive occupation of horizontal space of the upper beam bracket 1 taken by the above-mentioned structure. As a result, the first distance L between the blind fabric 11 and the first wall surface 4101 and the second distance M between the blind fabric 11 and the second wall surface 4102 can be reduced, which minimizes light leakage. If the distance between the blind fabric and the wall surface is too large, it will worsen the problem of light leakage. In this embodiment, the material of the upper beam bracket 1 is wood, and the first mounting bracket 42 and the second mounting bracket 43 are respectively fixedly mounted on the upper beam bracket 1 by means of bolts.

Figure 21:
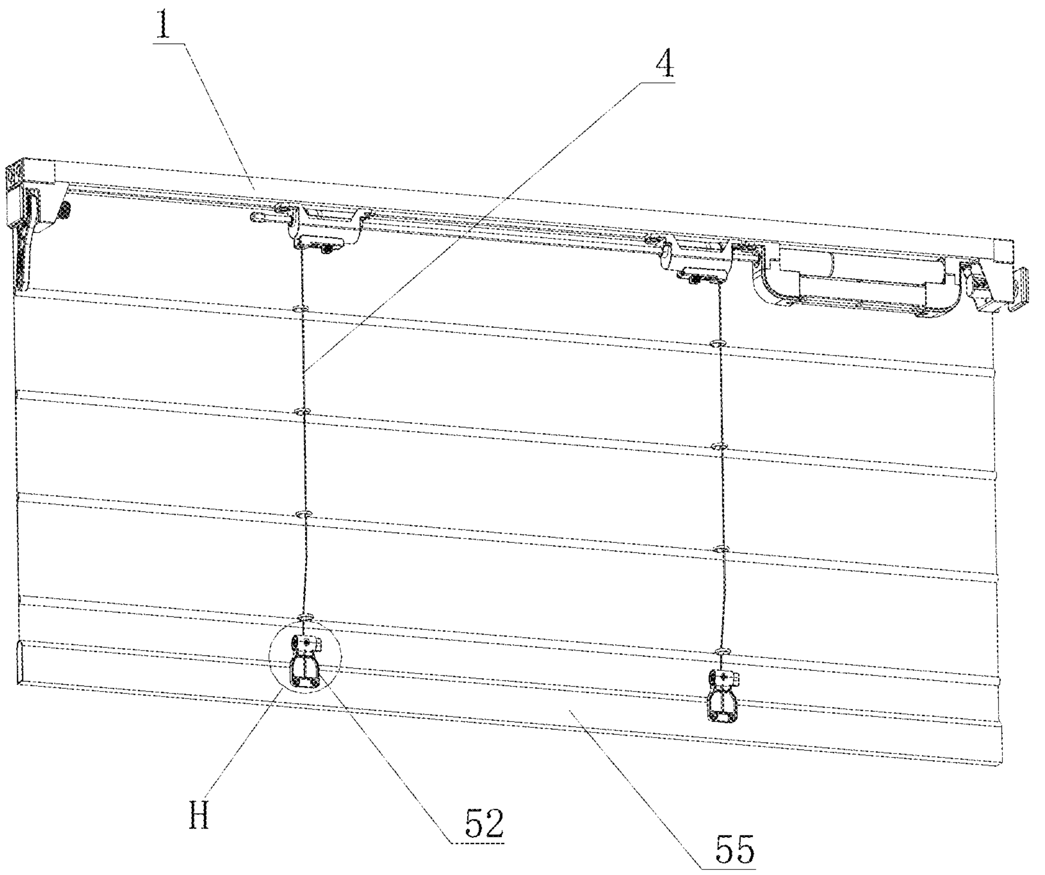
FIG. 21 is a schematic structural diagram of a cord buckle body of the blind cord resistance adjustment structure according to the present disclosure.

Referring to FIG. 21, the blind cord resistance adjustment structure further includes a cord buckle body 52 and a rotating component 53. The rotating component 53 is arranged on the cord buckle body 52. One end of the blind cord 4 is connected to the rotating component 53. The cord buckle body 52 and the rotating component 53 are movably engaged. The rotating component 53 is switchable between a locked state and an unlocked state, and the rotating component 53 is rotatable when it is in the unlocked state. A locking mechanism is arranged between the cord buckle body 52 and the rotating component 53. The locking mechanism includes a second elastic member 54 arranged between the cord buckle body 52 and the rotating component 53. In the normal state, the rotating component 53 is driven to engage with the cord buckle body 52 by the elastic force of the second elastic member 54, so that the rotating component 53 is in the locked state under which it cannot be rotated. When adjusting, the rotating component 53 is driven by an external force to disengage from the cord buckle body 52, so that the rotating component 53 is in the unlocked state. By applying an external force to rotate the rotating component 53 in the forward direction, the curtain cord 4 is wound onto the rotating component 53. Conversely, by applying an external force to rotate the rotating component 53 in the reverse direction, the curtain cord 4 is released from the rotating component 53. The forward and reverse directions refer to opposite directions of rotation. When the adjustment is completed, the external force is removed, and the rotating component 53 is re-engaged with the cord buckle body 52 under the elastic force of the second elastic member 54, so that the rotating component 53 is switched back to the locked state. It should be noted that in actual use, when the blind cord 4 is not wound onto the rotating component 53, the blind cord 4 can be wound onto the rotating component 53 by rotating the rotating component 53 in either direction.

Figure 22:
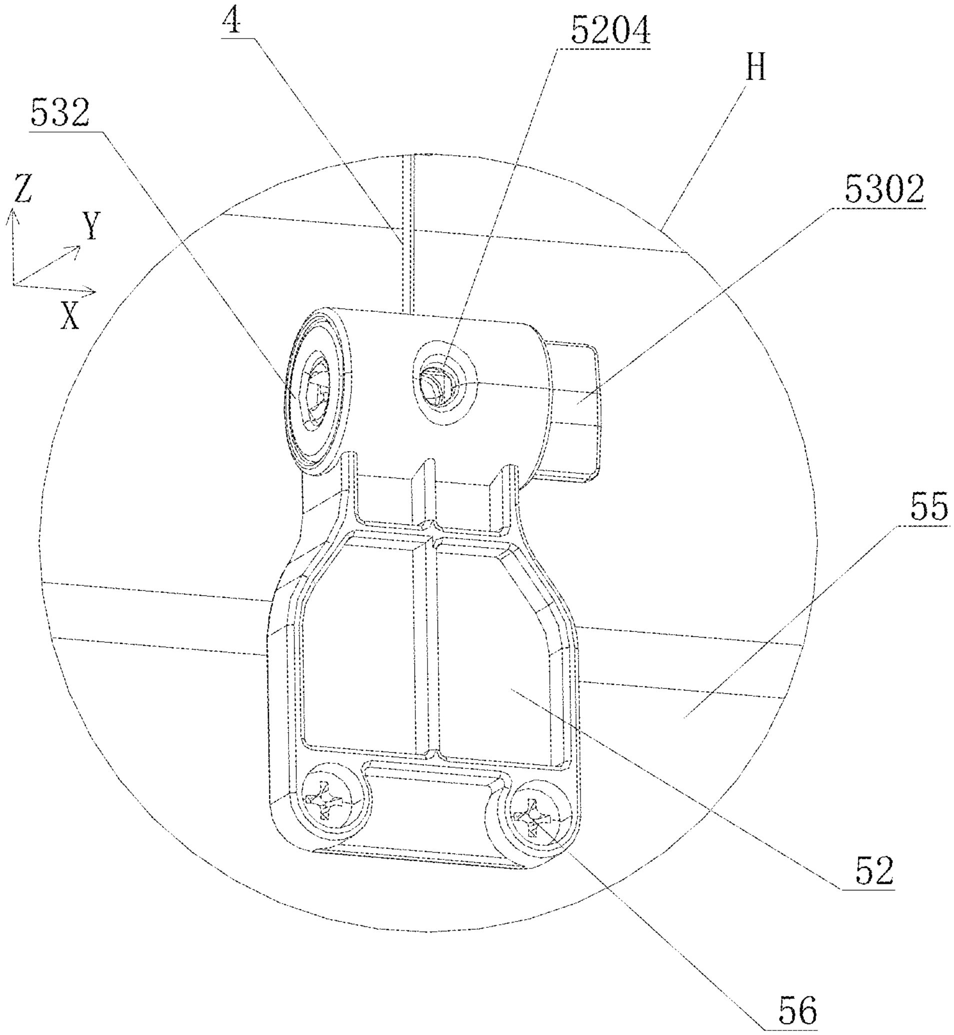
FIG. 22 is an enlarged view of area H in FIG. 21.

Referring to FIGS. 21, 22, 26, 27 and 28, the rotating component 53 is slidably arranged on the cord buckle body 52 along the axial direction, and the locking mechanism further includes second positioning teeth 5301 and second positioning grooves 5201 corresponding to the second positioning teeth 5301. The second positioning teeth 5301 are arranged on the rotating component 53, and the rotating component 53 is arranged on the cord buckle body 52. In the normal state, the elastic force of the second elastic member 54 drives the second positioning teeth 5301 to fall into and engage with the second positioning grooves 5201, so that the rotating component 53 is engaged with the cord buckle body 52. When adjusting, the rotating component 53 is driven to slide along the axial direction by an external force to disengage the second positioning teeth 5301 from the second positioning grooves 5201, so that the rotating component 53 is disengaged from the cord buckle body 52, allowing a convenient operation. Referring to FIG. 22, in this embodiment, the axial direction of the rotating component 53 is along the X-axis. A plurality of the second positioning teeth 5301 are distributed at equal intervals along the rotation direction of the rotating component 53, and a plurality of the second positioning grooves 5201 are distributed at equal intervals along the rotation direction of the rotating component 53, and the number of the second positioning grooves 5201 is greater than or equal to the number of second positioning teeth 5301. In this embodiment, the number of the second positioning grooves 5201 is greater than the number of the second positioning teeth 5301, so that the rotating component 53 can be engaged at more positioning angles, thereby enhancing the adjustment accuracy. Specifically, 6 second positioning teeth 5301 and 18 second positioning grooves 5201 are provided.

Referring to FIGS. 21, 22, 26, 27 and 28, the rotating component 53 includes a rotating rod 531 and an end cover 532 connected to one end of the rotating rod 531, the rotating rod 531 and the end cover 532 rotate and slide synchronously. The second elastic member 54 abuts between the rotating rod 531 and the cord buckle body 52. The second positioning teeth 5301 are arranged on the end cover 532, an annular flange 5322 is arranged on the end cover 532, and the second positioning teeth 5301 are arranged on the flange 5322. A second insertion column 5311 for inserting into the end cover 532 is arranged at one end of the rotating rod 531, and a second insertion recess 5321 into which the second insertion column 5311 is inserted is arranged on the end cover 532. The rotating component 53 is configured as a split structure composed of the rotating rod 531 and the end cover 532, the difficulty of manufacturing and assembly is reduced, thereby lowering production costs.

Referring to FIGS. 21 to 27, a manual knob 5302 is provided at one end of the rotating component 53. During adjusting, the external force drives the rotating component 53 to rotate by rotating the manual knob 5302, allowing an easy operation. The cord buckle body 52 is provided with an inner cavity 5202 for mounting the rotating component 53, the cord buckle body 52 is further provided with a third through-hole 5203 and a fourth through-hole 5204 communicating with the inner cavity 5202, and the rotating component 53 is provided with a fifth through-hole 5303. When mounting the blind cord 4, one end of the blind cord 4 passes through the third through-hole 5203, the fifth through-hole 5303 and the fourth through-hole 5304 in sequence. A limiting portion 5101 is provided at the position where the blind cord 4 passes through the fourth through-hole 5204, the diameter of the limiting portion 5101 is greater than the diameter of the fifth through-hole 5303, and the diameter of the limiting portion 5101 is smaller than the diameter of the fourth through-hole 5204, so that the limiting portion 5101 passes through the fourth through-hole 5204 and is limited at the fifth through-hole 5303. In this embodiment, the limiting portion 5101 is a cord knot, and the limiting portion 5101 may also be configured as other spherical or block-shaped objects for limiting its position. The above-mentioned spherical or block-shaped objects may be fixed to the end of the blind cord 4 by means of glue, welding, or the like.

Figure 24:
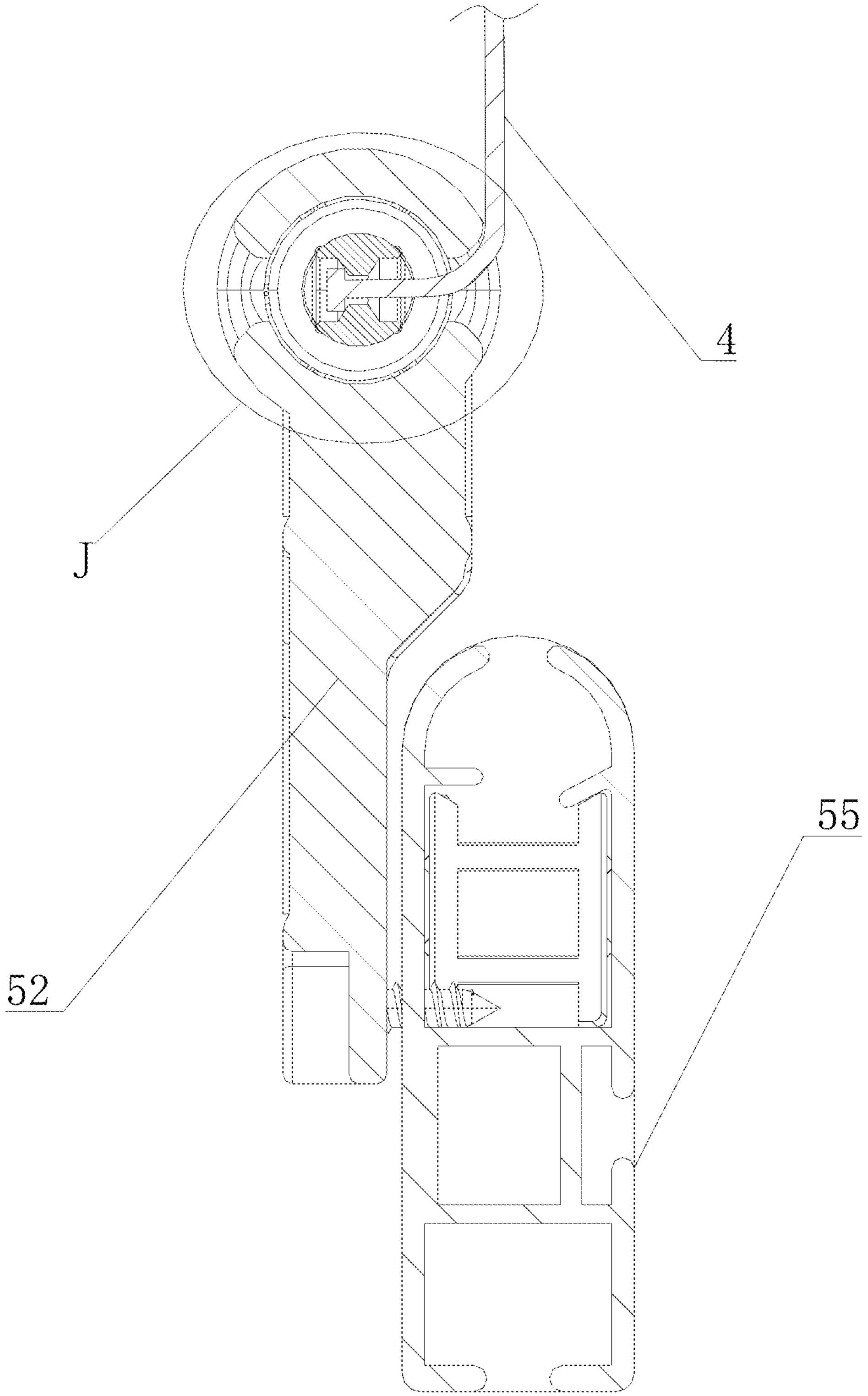
FIG. 24 is a second cross-sectional view of the blind cord body resistance adjustment structure of the present disclosure.
Figure 25:
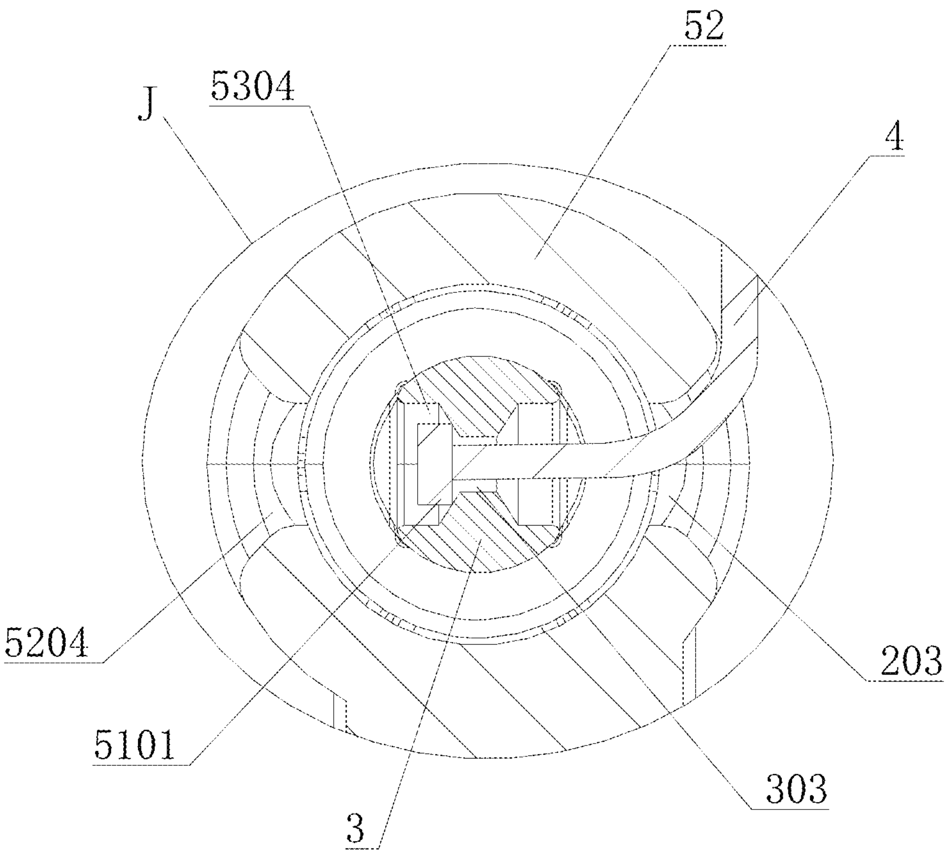
FIG. 25 is an enlarged view of area J in FIG. 24.
Figure 26:
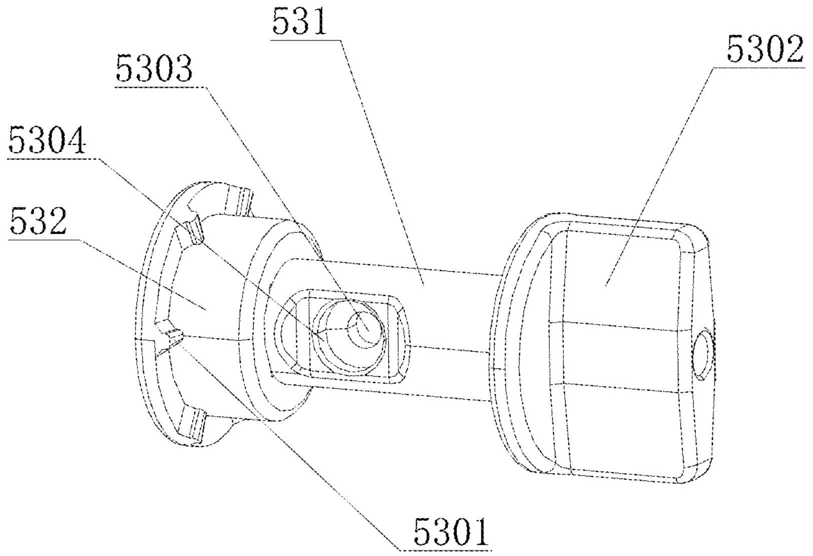
FIG. 26 is a schematic structural diagram of a rotating component of the blind cord resistance adjustment structure according to the present disclosure.
Figure 27:
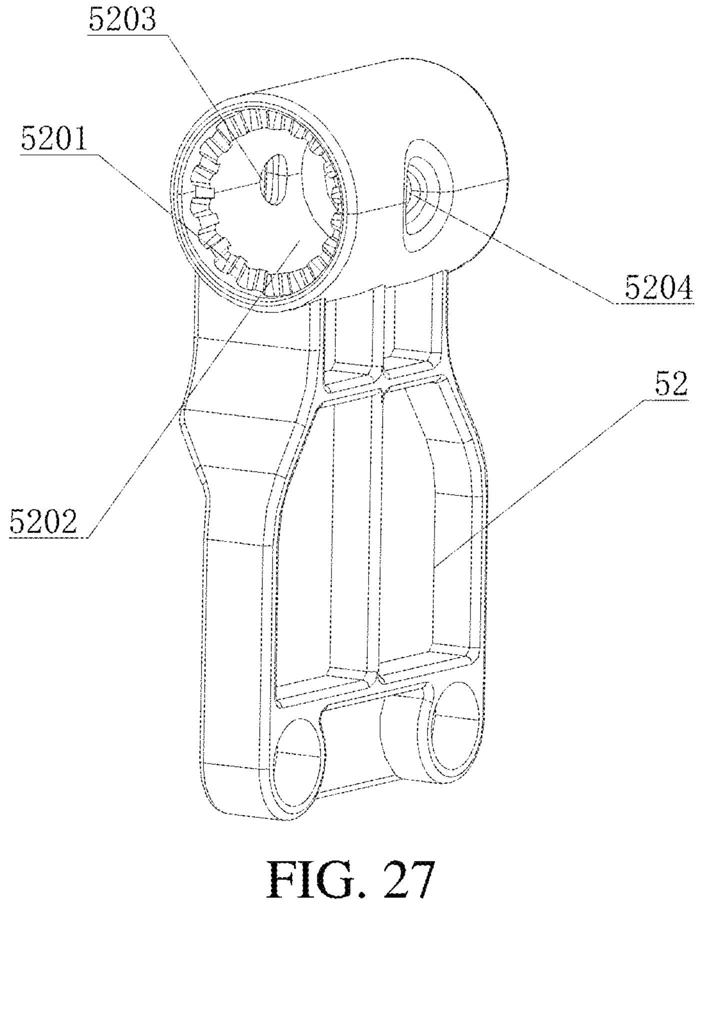
FIG. 27 is a schematic structural diagram of the cord buckle body of a blind cord resistance adjustment structure according to the present disclosure.
Figure 28:
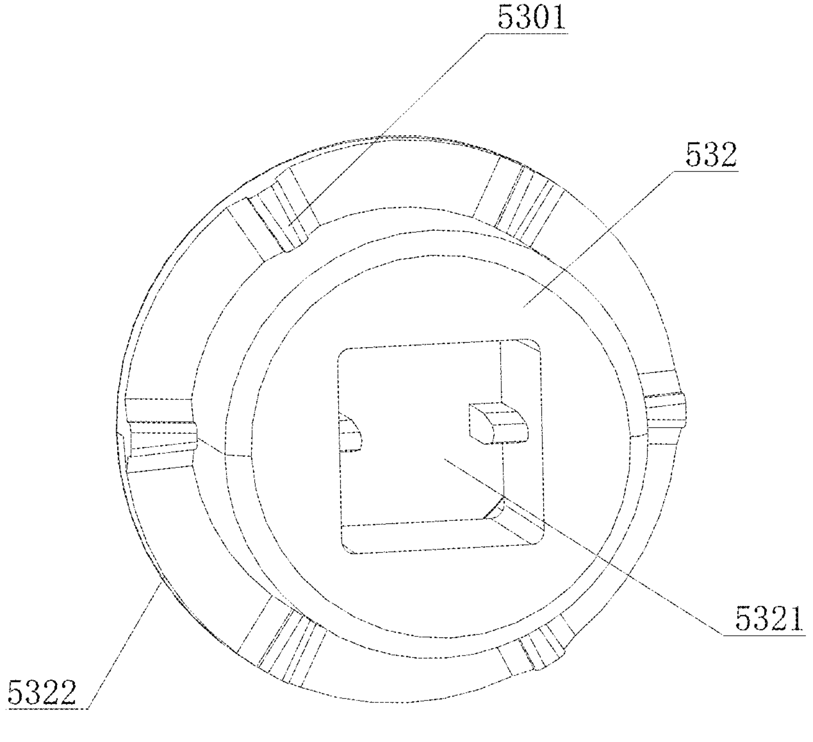
FIG. 28 is a schematic structural diagram of an end cover of the blind cord resistance adjustment structure according to the present disclosure.

Referring to FIGS. 24 to 26, the rotating component 53 is provided with a second recess 5304 for limiting the limiting portion 5101, so that the limiting portion 5101 enters the second recess 5304 and is not easily displaced after installation.

Figure 23:
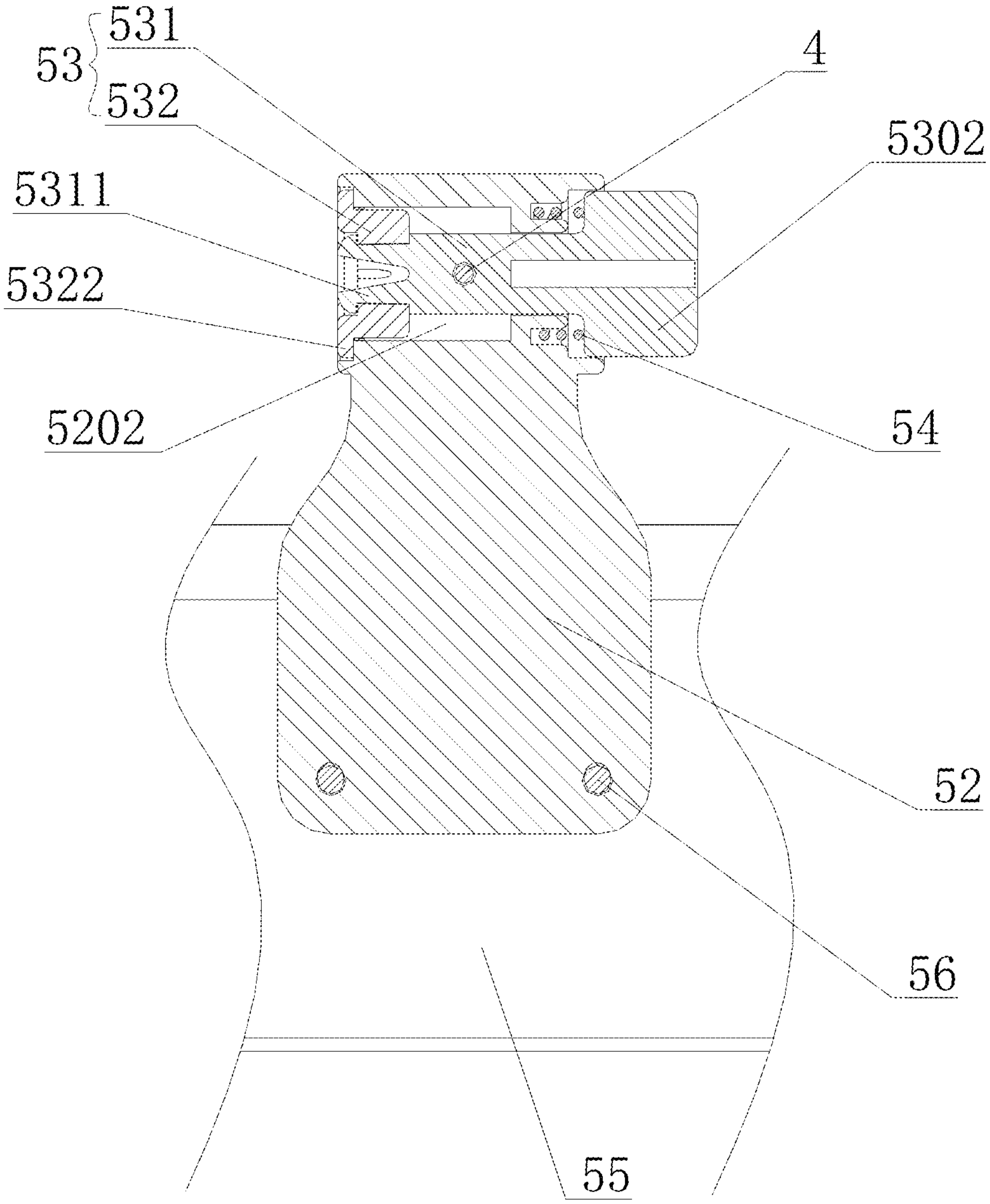
FIG. 23 is a first cross-sectional view of the cord buckle body of the blind cord resistance adjustment structure of the present disclosure.

Referring to FIGS. 21 to 23, the second elastic member 54 is a second compression spring, which has a simple structure and low cost. One end of the second elastic member 54 abuts against the cord buckle body 52, and the other end of the second elastic member 54 abuts against the rotating component 53. The elastic force generated by the compression spring in the compressed state drives the rotating component 53 to engage with the cord buckle body 52, resulting in a reasonable structure. The height-adjustable cord buckle structure further includes a lower beam bracket 55, and the cord buckle body 52 and the lower beam bracket 55 are fixedly connected by a second bolt 56. Two cord buckle bodies 52 and two blind cords 4 can be provided, and one rotating component 53 is provided on each cord buckle body 52. In this embodiment, two cord buckle bodies 52 are provided, and the rotating component 53 on any one of the cord buckle bodies 52 can be rotated and adjusted as needed to allow the two cord buckle bodies 52 to be located at the same height, enabling a flexible adjustment.

The blind cord resistance adjustment structure of the present disclosure is provided with an adjustment block. The horizontal distance between the first through-hole and the second through-hole is adjusted by sliding the adjustment block, thereby adjusting the friction force applied to the blind cord, allowing a convenient adjustment. The friction resistance on the blind cord is adjusted according to the weight of the blind fabrics to adapt to blind fabrics of different weights, allowing an accurate positioning when adjusting the height of the blind fabric and a better user experience. The first wear-resistant member and the second wear-resistant member are provided to rub against the blind cord, so that direct friction between the housing and the adjustment block and the blind cord is avoided, thereby preventing damage to the housing and the adjustment block due to excessive wear and extending the service life. The adjustment block is detachably provided with a first bolt to avoid the adjustment block accidentally slipping out of the first positioning grooves due to the tension of the blind cord caused by factors such as excessive weight of the blind or wear and deformation of the first positioning teeth during use, thereby ensuring a reliable structure.

In addition, the present disclosure further provides a blind, including the above-mentioned blind cord resistance adjustment structure. This blind also has the beneficial effects of the above-mentioned blind cord resistance adjustment structure, which will not be repeated herein.

The technical features of the above embodiments may be combined in any suitable manner. For brevity, not all possible combinations of the technical features in the aforementioned embodiments have been described. However, as long as there is no conflict among the combinations of these technical features, they shall be considered within the scope of this specification.

What is claimed is:

1. A blind cord resistance adjustment structure, comprising a cord-winding shaft assembly, an adjustment block (3) and a blind cord (4), wherein the cord-winding shaft assembly comprises a housing (21), a rotating shaft (22) and a shaft sleeve (23), the shaft sleeve (23) is rotatably mounted in the housing (21) along a circumferential direction of the shaft sleeve, the shaft sleeve (23) is sleeved on the rotating shaft (22) and rotates synchronously with the rotating shaft (22), an upper end of the blind cord (4) is connected to the shaft sleeve (23), and the adjustment block (3) is slidably arranged on a lower side of the housing (21) along a horizontal direction or a substantially horizontal direction, a first through-hole (210) for the blind cord (4) to pass through is provided on the housing (21), a second through-hole (31) for the blind cord (4) to pass through is provided on the adjustment block (3), at least one elastically deformable deformation portion (32) is provided on the adjustment block (3), first positioning teeth (321) are provided on the deformation portion (32), and a plurality of first positioning grooves (211) corresponding to the first positioning teeth (321) are provided on the housing (21), and the plurality of first positioning grooves (211) are distributed along a sliding direction of the adjustment block (3).

2. The blind cord resistance adjustment structure according to claim 1, wherein a first wear-resistant member (5) is provided on the housing (21), a second wear-resistant member (6) is provided on the adjustment block (3), the first through-hole (210) is formed on the first wear-resistant member (5), the second through-hole (31) is formed on the second wear-resistant member (6), and the first through-hole (210) and the second through-hole (31) are both arranged to penetrate in a vertical direction.

3. The blind cord resistance adjustment structure according to claim 2, wherein a first limiting flange (51) is provided on an upper part of the first wear-resistant member (5), and a second limiting flange (61) is provided on an upper part of the second wear-resistant member (6); during installation, the first limiting flange (51) abuts against the housing (21) and is limited thereby, and the second limiting flange (61) abuts against the adjustment block (3) and is limited thereby.

4. The blind cord resistance adjustment structure according to claim 2, wherein the housing (21) is provided with a first mounting groove (212) for mounting the first wear-resistant member (5), a plurality of first protrusions (213) are annularly distributed on an inner wall of the first mounting groove (212) for tightly fitting against the first wear-resistant member (5), and an upper end of each first protrusion (213) is provided with a first guiding bevel (214) for facilitating insertion of the first wear-resistant member (5) into the first mounting groove (212); the adjustment block (3) is provided with a second mounting groove (33) for mounting the second wear-resistant member (6), second protrusions (331) are annularly distributed on an inner wall of the second mounting groove (33) for tightly fitting against the second wear-resistant member (6), and an upper end of each second protrusion (331) is provided with a second guiding bevel (332) for facilitating insertion of the second wear-resistant member (6) into the second mounting groove (33).

5. The blind cord resistance adjustment structure according to claim 1, wherein the deformation portion (32) is an elastic strip capable of being elastically bent, two deformation portions (32) are symmetrically arranged, a deformation space (320) for the deformation portion (32) to bend and deform is arranged between the two deformation portions (32), and handle blocks (322) are integrally formed on a lower side of the deformation portions (32); when adjusting, the handle blocks (322) are driven by an external force to force the deformation portions (32) to be elastically bent.

6. The blind cord resistance adjustment structure according to claim 1, wherein a first rotating column (231) and a second rotating column (232) are respectively provided on either end of the shaft sleeve (23), a first insertion hole (215) corresponding to the first rotating column (231) and a second insertion hole (216) corresponding to the second rotating column (232) are provided on the housing (21), an elastically deformable mounting plate (217) is provided on the housing (21), the second insertion hole (216) is provided on the mounting plate (217), and a third guiding bevel (218) is provided on the mounting plate (217) for facilitating insertion of the second rotating column (232) into the second insertion hole (216).

7. The blind cord resistance adjustment structure according to claim 1, wherein a sliding groove (8) is provided on the lower side of the housing (21), a slider (34) slidably engaged with the sliding groove (8) is provided on the adjustment block (3), an opening (81) is provided on a lateral end of the sliding groove (8), and the slider (34) slides into the sliding groove (8) from the opening (81).

8. The blind cord resistance adjustment structure according to claim 1, wherein a first bolt (9) is detachably arranged on the adjustment block (3), after the adjustment block (3) is adjusted, the first bolt (9) is screwed in by an external force so that one end of the first bolt (9) is pressed against the housing (21) to limit a relative sliding between the adjustment block (3) and the housing (21); a mounting strip (219) is provided on the housing (21), the first positioning grooves (211) are provided on the mounting strip (219), a limiting protrusion (35) for abutting against the mounting strip (219) and being limited thereby is provided on the adjustment block (3), a fourth guiding bevel (351) is provided on the limiting protrusion (35), and when the second through-hole (31) is located directly below the first through-hole (210), the limiting protrusion (35) abuts against the mounting strip (219) and is limited thereby.

9. The blind cord resistance adjustment structure according to claim 1, further comprising an upper beam bracket (1), wherein the housing (21) is arranged on a lower side of the upper beam bracket (1), a cord winder (7) connected to the rotating shaft (22) is arranged on the lower side of the upper beam bracket (1), and a rotating drum (71) and a coil spring (72) are arranged inside the cord winder (7), the rotating drum (71) is sleeved on the rotating shaft (22) and rotates synchronously with the rotating shaft (22), and a pull-out end of the coil spring (72) is connected to the rotating drum (71).

10. The blind cord resistance adjustment structure according to claim 9, further comprising a first mounting bracket (42) and a second mounting bracket (43), wherein the first mounting bracket (42) and the second mounting bracket (43) are respectively arranged at two ends of the upper beam bracket (1), the first mounting bracket (42) is threadedly connected with a mounting screw rod (44), one end of the mounting screw rod (44) close to an external first wall surface (4101) is connected with a first fixing block (45), the mounting screw rod (44) is circumferentially rotatable relative to the first fixing block (45), and a first anti-slip pad (46) is arranged on a side of the first fixing block (45) close to the first wall surface (4101); the second mounting bracket (43) is provided with a second fixing block (47) and a first elastic member (48), the second fixing block (47) is slidably arranged on the second mounting bracket (43) along an axial direction of the second fixing block, the first elastic member (48) is arranged between the second mounting bracket (43) and the second fixing block (47), and a second anti-slip pad (49) is provided on a side of the second fixing block (47) close to an external second wall surface (4102); during installation, the elastic force of the first elastic member (48) drives the second fixing block (47) to slide toward the second wall surface (4102), so that the second anti-slip pad (49) abuts against the second wall surface (4102); the mounting screw rod (44) is rotated by an external force, so that the mounting screw rod (44) drives the first fixing block (45) to move toward the first wall surface (4101), and the second mounting bracket (43) moves toward the second fixing block (47) until the second mounting bracket (43) abuts against the second fixing block (47), causing the first anti-slip pad (46) to press tightly against the first wall surface (4101) and the second anti-slip pad (49) to press tightly against the second wall surface (4102), thereby securing the upper beam bracket (1) between the first wall (4101) and the second wall (4102).

11. The blind cord resistance adjustment structure according to claim 10, wherein the first elastic member (48) is a first compression spring, one end of the first elastic member (48) abuts against the second fixing block (47), and the other end of the first elastic member (48) abuts against the second mounting bracket (43); before installation, the elastic force of the first elastic member (48) drives one end of the second fixing block (47) provided with the second anti-slip pad (49) to extend out of the second mounting bracket (43); the second mounting bracket (43) is provided with a first positioning column (431) for fitting and positioning the other end of the first compression spring, and the second fixing block (47) is provided with a second positioning column (471) for fitting and positioning the one end of the first compression spring; after installation, the first positioning column (431) abuts against the second positioning column (471); the mounting screw rod (44) is provided with an external thread (4401), and the first mounting bracket (42) is provided with an internal thread (4201) matching the external thread (4401).

12. The blind cord resistance adjustment structure according to claim 10, wherein the first fixing block (45) is provided with a first insertion column (4501), and the mounting screw rod (44) is provided with a first insertion recess (4402) engageable with the first insertion column (4501); the first mounting bracket (42) is provided with a limiting block (4202) for limiting the rotation of the first fixing block (45); a plane bearing (410) is provided between the mounting screw rod (44) and the first fixing block (45); the first anti-slip pad (46) is made of silicone, rubber, or foam, and the second anti-slip pad (49) is made of silicone, rubber, or foam.

13. The blind cord resistance adjustment structure according to claim 10, wherein an adjustment block (4403) is provided at one end of the mounting screw rod (44), a longitudinal section of the adjustment block (4403) is in a shape of a regular polygon, a plurality of first recesses (4404) are provided on the adjustment block (4403), and the first recesses (4404) are in an I-shape; the mounting screw rod (44), the first fixing block (45), the first anti-slip pad (46), the second fixing block (47) and the second anti-slip pad (49) are all located on the lower side of the upper beam bracket (1).

14. The blind cord resistance adjustment structure according to claim 1, further comprising a cord buckle body (52) and a rotating component (53), wherein the rotating component (53) is arranged on the cord buckle body (52), one end of the blind cord (4) is connected to the rotating component (53), the cord buckle body (52) and the rotating component (53) are movably engaged, the rotating component (53) is switchable between a locked state and an unlocked state, and the rotating component (53) is rotatable in the unlocked state; a locking mechanism is arranged between the cord buckle body (52) and the rotating component (53), and the locking mechanism comprises a second elastic member (54) arranged between the cord buckle body (52) and the rotating component (53); in a normal state, the rotating component (53) is driven to engage with the cord buckle body (52) by the elastic force of the second elastic member (54), so that the rotating component (53) is in the locked state in which the rotating component (53) cannot be rotated; during adjustment, the rotating component (53) is driven by an external force to disengage from the cord buckle body (52), so that the rotating component (53) is in the unlocked state; the rotating component (53) is rotated in a forward direction by an external force to wind the blind cord (4) onto the rotating component (53); and the rotating component (53) is rotated in a reverse direction by an external force to release the blind cord (4) from the rotating component (53).

15. The blind cord resistance adjustment structure according to claim 14, wherein the rotating component (53) is slidably arranged on the cord buckle body (52) along an axial direction of the rotating component (53), and the locking mechanism further comprises at least one second positioning tooth (5301) and a second positioning groove (5201) corresponding to and engageable with the second positioning tooth (5301), the second positioning tooth (5301) is arranged on the rotating component (53), and the rotating component (53) is arranged on the cord buckle body (52); in a normal state, the elastic force of the second elastic member (54) drives the second positioning tooth (5301) to engage with the second positioning groove (5201), so that the rotating component (53) and the cord buckle body (52) are engaged; during adjustment, the rotating component (53) is driven to slide along the axial direction by an external force, so that the second positioning tooth (5301) is disengaged from the second positioning groove (5201), thereby disengaging the rotating component (53) from the cord buckle body (52).

16. The blind cord resistance adjustment structure according to claim 15, wherein a plurality of second positioning teeth (5301) are evenly distributed along a rotation direction of the rotating component (53), a plurality of second positioning grooves (5201) are evenly distributed along the rotation direction of the rotating component (53), and a number of the second positioning grooves (5201) is greater than or equal to a number of the second positioning teeth (5301).

17. The blind cord resistance adjustment structure according to claim 15, wherein the rotating component (53) comprises a rotating rod (531) and an end cover (532) connected to one end of the rotating rod (531), the rotating rod (531) and the end cover (532) rotate and slide synchronously, the second elastic member (54) abuts between the rotating rod (531) and the cord buckle body (52), the second positioning tooth (5301) is arranged on the end cover (532), and a manual knob (5302) is arranged at one end of the rotating component (53); during adjustment, the manual knob (5302) is rotated by an external force to drive the rotating component (53) to rotate.

18. The blind cord resistance adjustment structure according to claim 14, wherein the cord buckle body (52) is provided with an inner cavity (5202) for mounting the rotating component (53), the cord buckle body (52) is provided with a third through-hole (5203) and a fourth through-hole (5204) which are communicated with the inner cavity (5202), and the rotating component (53) is provided with a fifth through-hole (5303); when mounting the blind cord (4), one end of the blind cord (4) passes through the third through-hole (5203), the fifth through-hole (5303) and the fourth through-hole (5204) in sequence; a limiting portion (5101) is provided at a position where the blind cord (4) passes through the fourth through-hole (5204), a diameter of the limiting portion (5101) is greater than a diameter of the fifth through-hole (5303), and the diameter of the limiting portion (5101) is smaller than a diameter of the fourth through-hole (5204), so that the limiting portion (5101) passes through the fourth through-hole (5204) and is limited by the fifth through-hole (5303); and a second recess (5304) for limiting the limiting portion (5101) is provided on the rotating component (53).

19. The blind cord resistance adjustment structure according to claim 14, further comprising a lower beam bracket (55), wherein two cord buckle bodies (52) and two blind cords (4) are provided, and the cord buckle bodies (52) are fixedly connected to the lower beam bracket (55); each cord buckle body (52) is provided with a corresponding rotating component (53); the second elastic member (54) is a second compression spring, one end of the second elastic member (54) is in contact with a corresponding cord buckle body (52), and the other end of the second elastic member (54) is in contact with the corresponding rotating component (53).

20. A blind, comprising the blind cord resistance adjustment structure according to claim 1.

* * * * *